(12) United States Patent
Deshpande

(10) Patent No.: US 11,502,763 B2
(45) Date of Patent: Nov. 15, 2022

(54) METHOD FOR SIGNALING, METHOD FOR RECEIVING, SIGNALING DEVICE, AND RECEIVING DEVICE

(71) Applicant: SHARP KABUSHIKI KAISHA, Osaka (JP)

(72) Inventor: Sachin G. Deshpande, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/532,963

(22) Filed: Nov. 22, 2021

(65) Prior Publication Data
US 2022/0085902 A1  Mar. 17, 2022

Related U.S. Application Data

(63) Continuation of application No. 16/997,257, filed on Aug. 19, 2020, now Pat. No. 11,212,021, which is a continuation of application No. 15/769,861, filed as application No. PCT/JP2016/004660 on Oct. 21, 2016, now Pat. No. 10,797,814.

(60) Provisional application No. 62/331,376, filed on May 3, 2016, provisional application No. 62/255,446, filed on Nov. 14, 2015, provisional application No. 62/245,525, filed on Oct. 23, 2015.

(51) Int. Cl.
| | |
|---|---|
| H04H 60/73 | (2008.01) |
| H04H 60/35 | (2008.01) |
| H04N 21/235 | (2011.01) |
| H04N 21/435 | (2011.01) |
| H04N 21/61 | (2011.01) |
| H04N 21/84 | (2011.01) |
| H04L 65/611 | (2022.01) |
| H04L 65/1101 | (2022.01) |
| H04W 72/00 | (2009.01) |

(52) U.S. Cl.
CPC ............ H04H 60/73 (2013.01); H04H 60/35 (2013.01); H04L 65/1101 (2022.05); H04L 65/611 (2022.05); H04N 21/2353 (2013.01); H04N 21/435 (2013.01); H04N 21/6112 (2013.01); H04N 21/84 (2013.01); *H04W 72/005* (2013.01)

(58) Field of Classification Search
CPC .... H04H 60/73; H04H 60/35; H04L 65/1101; H04L 65/611; H04N 21/2353; H04N 21/435; H04N 21/6112; H04N 21/84; H04W 72/005
See application file for complete search history.

(56) References Cited

U.S. PATENT DOCUMENTS

| | | | |
|---|---|---|---|
| 3,780,809 A | 12/1973 | Ayers, Jr et al. | |
| 2014/0372570 A1 | 12/2014 | Gupta et al. | |
| 2016/0205158 A1* | 7/2016 | Lo .......................... | H04L 65/60 709/219 |
| 2016/0248828 A1* | 8/2016 | Kitahara ................. | H04L 65/60 |

(Continued)

OTHER PUBLICATIONS

Addison Phillips, Mark Davis. "Tags for Identifying Languages", Network Working Group, Best Current Practice (BCP) 47, Sep. 2009.

(Continued)

*Primary Examiner* — Austin J Moreau
(74) *Attorney, Agent, or Firm* — ScienBizP, P.C.

(57) ABSTRACT

A system for generating, transmitting, providing and/or receiving signaling.

5 Claims, 49 Drawing Sheets

| Element or Attribute Name | Use | Data type | Description |
|---|---|---|---|
| RprFlow | | rprFlowType | Repair flow carried in the LCT session referenced by signaling metadata. |
| FECParameters | | | FEC Parameters corresponding to the repair flow |
| @maximumDelay | 0..1 | unsignedInt | Specifies the maximum delivery delay between any source packet in the source flow and the repair flow. Default value = 0. |
| @overhead | 0..1 | unsignedShort (percentage) | Specifies the overhead in percentage |
| @minBuffSize | 0..1 | unsignedInt | Specifies the required buffer size. If present then this attribute defines the minimum buffer size that is required to handle all associated objects that are assigned to a super-object. |
| FECOTI | 1 | string | Specifies the FEC Object Transmission Information (FEC OTI) as defined in RFC 5052 FEC OTI corresponds to FEC related information associated with an object as well as FEC information associated with the encoding symbols of the object and is to be included within this declaration and applies to all repair packets with the repair flow. |
| ProtectedObject | 0..N | protectedObjectType | Specifies the source flow(s) protected by this Repair Flow and the details on how the protection is done. It also defines how certain delivery objects of a collection of objects are included in the repair flow. |

(56) References Cited

U.S. PATENT DOCUMENTS

| | | | |
|---|---|---|---|
| 2016/0261893 A1* | 9/2016 | Oh | ............ H04N 21/2353 |
| 2016/0277774 A1 | 9/2016 | Yamagishi et al. | |
| 2016/0316270 A1 | 10/2016 | An et al. | |
| 2016/0359803 A1 | 12/2016 | Kwon et al. | |
| 2017/0171575 A1 | 6/2017 | Moon et al. | |
| 2017/0272543 A1 | 9/2017 | Lo et al. | |

OTHER PUBLICATIONS

Toni Paila et al. "FLUTE—File Delivery over Unidirectional Transport," Internet Engineering Task Force (IETF), RFC 6726, Nov. 2012.
ISO/IEC 23009-1, "Dynamic Adaptive Streaming over HTTP (DASH)-Part 1: Media presentation description and segment formats," Published in Switzerland, May 15, 2014.
ISO/IEC CD 23008-1, "Information technology-High efficiency coding and media delivery in heterogeneous environments-Part 1: MPEG media transport (MMT)," Geneva, Switzerland, Jan. 2013.
ATSC-Mobile DTV Standard, Part 4—Announcement (P27-38).
Genre Classification Scheme available at http://www.atsc.org/XMLSchemas/mh/2009/1.0/genre-cs/.
International Standard Organization (ISO) ISO 639-3 titled Codes for the representation of names of languages—Part 3: Alpha-3.
3GPP TS 26.346 V12.4.0(Release 12), "Universal Mobile Telecommunications System (UMTS); LTE; Multimedia Broadcast/Multicast Service (MBMS); Protocols and codecs," Jan. 2015.
Service Guide for Mobile Broadcast Services, Open Mobile Alliance, Version 1.1, Oct. 29, 2013.
Service Guide for Mobile Broadcast Services, Open Mobile Alliance, Version 1.0.1, Jan. 9, 2013.
"ATSC Candidate Standard: Signaling, Delivery,Synchronization, and Error Protection (A/331)" Jun. 21, 2016.
Non-Final Office Action dated Sep. 20, 2019 for U.S. Appl. No. 15/769,861.
Final Office Action dated Feb. 12, 2020 for U.S. Appl. No. 15/769,861.
Advisory Action dated May 7, 2020 for U.S. Appl. No. 15/769,861.
Aaron Binns, "OpenSearch API", IA Webteam Confluence, Jun. 15, 2010.
Notice of Allowance and Fee(s) Due dated Jun. 11, 2020 for U.S. Appl. No. 15/769,861.
"File and Stream Distribution for Mobile Broadcast Services", Candidate Version 1.2, Open Mobile Alliance, pp. 1-82, Jan. 14, 2014.
Notice of Allowance and Fee(s) Due dated Aug. 23, 2021 for U.S. Appl. No. 16/997,257.

* cited by examiner

| Name | Type | Category | Cardinality | Description | Data Type |
|------|------|----------|-------------|-------------|-----------|

FIG. 4

| Name | Type | Category | Cardinality | Description | Data Type |
|---|---|---|---|---|---|
| ServiceMediaExtension | E1 | NM/TM | 1 | Additional information about the media services. Contains the following elements: MajorChannelNum and MinorChannelNum | |
| MajorChannelNum | E2 | NM/TM | 0..1 | Major channel number of the service. The language is expressed using built-in CML attribute 'xml:lang' with this element | String |
| MinorChannelNum | E2 | NM/TM | 0..1 | Minor channel number of the service. The language is expressed using built-in CML attribute 'xml:lang' with this element | String |

FIG. 5

| Name | Type | Category | Cardinality | Description | Data Type |
|---|---|---|---|---|---|
| ServiceMediaExtension | E1 | NM/TM | 1 | Additional information about the media services. Contains the following element: icon | |
| Icon | E2 | NM/TM | 0..N | Url pointing to icon used to represent the service is ESG. Multiple URLs could be used to point to icons of different width and height or different representation formats. | anyURI |

FIG. 6

| Name | Type | Category | Cardinality | Description | Data Type |
|---|---|---|---|---|---|
| ServiceMediaExtension | E1 | NM/TM | 1 | Additional information about the media services. Contains the following attribute: url | |
| url | A | NM/TM | 1 | URL to uniquely identify the video broadcast extension. For example a URI such as the following may be used: http://www.servicexyz.org/XMLSchemas/ASTC/2014/3.0/ServiceExt | anyURI |

FIG. 7

| Name | Type | Category | Cardinality | Description | Data Type |
|---|---|---|---|---|---|
| ServiceMediaExtension | E1 | NM/TM | 1 | Additional information about the media services. Contains the following elements: MajorChannelNum, MinorChannelNum, Icon, and element url | |
| MajorChannelNum | E2 | NM/TM | 0..1 | Major channel number of the service. The language is expressed using built-in CML attribute 'xml:lang' with this element | String |
| MinorChannelNum | E2 | NM/TM | 0..1 | Minor channel number of the service. The language is expressed using built-in CML attribute 'xml:lang' with this element | String |
| Icon | E2 | NM/TM | 0..N | Url pointing to icon used to represent the service is ESG. Multiple URLs could be used to point to icons of different width and height or different representation formats. | anyURI |
| url | A | NM/TM | 1 | URL to uniquely identify the video broadcast extension. For example a URI such as the following may be used: http://www.atsc.org/XMLSchemas/ASTC/2014/3.0/ServiceExt | anyURI |

FIG. 8

| Name | Type | Category | Cardinality | Description | Data Type |
|---|---|---|---|---|---|
| AudioLanguage | E1 | NM/TM | 0..N | This element declares for the end users that this service is available with an audio track corresponding to the language represented by the value of this element.<br><br>The textual value of this element can be made available for the end users in different languages.<br><br>In such a case the language used to represent the value of this element is signalled using the builtin XML attribute 'xml:lang'. See section 7, Multi-language support.<br><br>Contains the following attribute: languageSDPTag language | string |
| languageSDPTag | A | NM/TO | 0..1 | Identifier of the audio language described by the parent 'AudioLanguage' element as used in the media sections describing the audio track in a Session Description.<br><br>The 'languageSDPTag' may be formatted according to the rules of [RFC 3066], for the described language.<br><br>Each 'AudioLanguage' element declaring the same audio stream may have the same value of the 'languageSDPTag' | String |
| language | A | NM/TM | 1 | Primary language for the audio component of the service | String |

FIG. 9A

| TextLanguage | E1 | NM/ TM | 0..N | This element declares for the end user that the textual components of this service are available in the language represented by the value of this element. The textual components can be, for instance, a caption or a sub-title track.<br><br>The textual value of this element can be made available for the end users in different languages.<br><br>In such a case the language used to represent the value of this element is signaled using the builtin XML attribute 'xml:lang'. See section 7 Multilanguage support.<br><br>The same rules and constraints as specified for the element 'AudioLanguage' of assigning and interpreting the attributes 'languageSDPTag' and 'xml:lang' SHALL be applied for this element also.<br><br>Contains the following attribute: languageSDPTag language | string |
|---|---|---|---|---|---|

FIG. 9B

| languageSD PTag | A | NM/ TO | 0..1 | Identifier of the text language described by the parent 'TextLanguage' element as used in the media sections describing the textual track in a string OMA-TS-BCAST_Service_Guide-V1_0_1-20130109-A Page 25 (232) Ó 2013 Open Mobile Alliance Ltd. All Rights Reserved.

Used with the permission of the Open Mobile Alliance Ltd. under the terms as stated in this document. [OMA-Template-Spec-20130101-I] Session Description. | String |
|---|---|---|---|---|---|
| language | A | NM/ TM | 1 | Primary language for the text component of the service | String |

FIG. 9C

| Name | Type | Category | Cardinality | Description | Data Type |
|---|---|---|---|---|---|
| AudioLanguage | E1 | NM/ TM | 0..N | This element declares for the end users that this service is available with an audio track corresponding to the language represented by the value of this element.<br><br>The textual value of this element can be made available for the end users in different languages.<br><br>In such a case the language used to represent the value of this element is signalled using the builtin XML attribute 'xml:lang'. See section 7, Multi-language support.<br><br>Contains the following attribute: languageSDPTag | string |
| languageSDPTag | A | NM/ TO | 0..1 | Identifier of the audio language described by the parent 'AudioLanguage' element as used in the media sections describing the audio track in a Session Description.<br><br>The 'languageSDPTag' may be formatted according to the rules of [RFC 3066], for the described language.<br><br>Each 'AudioLanguage' element declaring the same audio stream may have the same value of the 'languageSDPTag'. | String |

FIG. 10A

| TextLanguage | E1 | NM/ TM | 0..N | This element declares for the end user that the textual components of this service are available in the language represented by the value of this element. The textual components can be, for instance, a caption or a sub-title track.<br><br>The textual value of this element can be made available for the end users in different languages.<br><br>In such a case the language used to represent the value of this element is signaled using the builtin XML attribute 'xml:lang'. See section 7 Multilanguage support.<br><br>The same rules and constraints as specified for the element 'AudioLanguage' of assigning and interpreting the attributes 'languageSDPTag' and 'xml:lang' SHALL be applied for this element also.<br><br>Contains the following attribute: languageSDPTag | string |
|---|---|---|---|---|---|

FIG. 10B

| languageSD PTag | A | NM/ TO | 0..1 | Identifier of the text language described by the parent 'TextLanguage' element as used in the media sections describing the textual track in a string OMA-TS-BCAST_Service_Guide-V1_0_1-20130109-A Page 25 (232) © 2013 Open Mobile Alliance Ltd. All Rights Reserved.

Used with the permission of the Open Mobile Alliance Ltd. under the terms as stated in this document. [OMA-Template-Spec-20130101-I] Session Description. | String |
|---|---|---|---|---|---|

FIG 10C

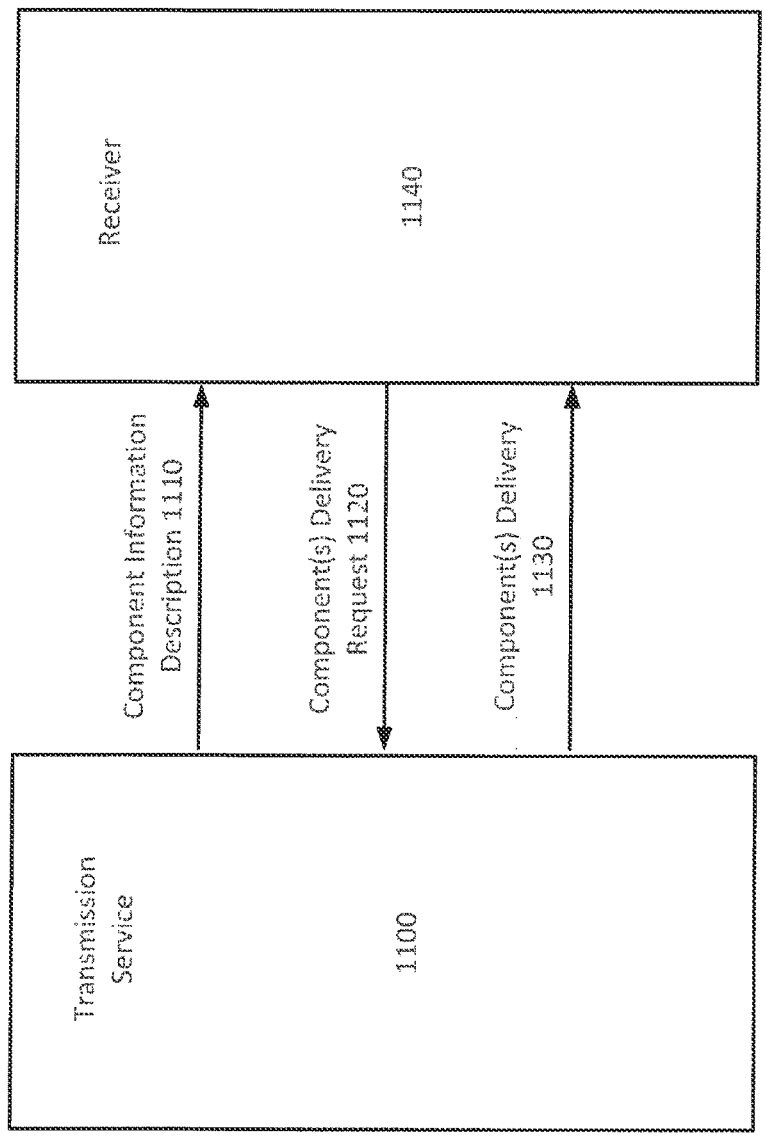

| Syntax | No. of Bits | Format |
|---|---|---|
| componentinfo_descriptor() { | | |
|     descriptor_tag | 8 | uimsbf |
|     descriptor_length | 8 | uimsbf |
|     num_components | 8 | uimsbf |
|     for(i=0;i<num_components;i++) { | | |
|         component_type | 3 | uimsbf |
|         component_role | 4 | uimsbf |
|         component_protected_flag | 1 | bslbf |
|         component_id | 8 | uimsbf |
|         component_name_length | 8 | uimsbf |
|         component_name_bytes() | var | |
|     } | | |
| } | | |

FIG. 13 A

| Syntax | No. of Bits | Format |
|---|---|---|
| componentinfo_descriptor() { | | |
|     descriptor_tag | 8 | uimsbf |
|     descriptor_length | 8 | uimsbf |
|     num_components | 8 | uimsbf |
|     for(i=0;i<num_components;i++) { | | |
|         component_type | 3 | uimsbf |
|         component_role | 4 | uimsbf |
|         component_protected_flag | 1 | bslbf |
|         component_id | 8 | uimsbf |
|     } | | |
| } | | |

FIG. 13 B

| Syntax | No. of Bits | Format |
|---|---|---|
| channel_descriptor() { | | |
|     descriptor_tag | 8 | uimsbf |
|     descriptor_length | 8 | uimsbf |
|     major_channel_num | 16 | uimsbf |
|     minor_channel_num | 16 | uimsbf |
|     service_lang_code | 24 | uimsbf |
|     service_genre_code | 8 | uimsbf |
|     service_descr_length | 8 | uimsbf |
|     service_descr_bytes() | var | |
|     icon_url_length | 8 | uimsbf |
|     icon_url_bytes() | var | |
| } | | |

FIG. 14 A

| Syntax | No. of Bits | Format |
|---|---|---|
| channel_descriptor() { | | |
|     descriptor_tag | 8 | uimsbf |
|     descriptor_length | 8 | uimsbf |
|     major_channel_num | 16 | uimsbf |
|     minor_channel_num | 15 | uimsbf |
|     ext_channel_info_present_flag | 1 | bslbf |
|     if (ext_channel_info_present_flag) { | | |
|     service_lang_code | 24 | uimsbf |
|     service_genre_code | 8 | uimsbf |
|     service_descr_length | 8 | uimsbf |
|     service_descr_bytes() | var | |
|     icon_url_length | 8 | uimsbf |
|     icon_url_bytes() | var | |
|     } | | |
| } | | |

FIG. 14 B

| Element or Attribute (@) Name | | | Cardinality | Data Type | Description |
|---|---|---|---|---|---|
| fichannel | | | | | Root element of the fast information channel information or user service bundle description |
| | Service | | 1...N | | ATSC service description |
| | | ComponentInfo | 1...N | | Contains information about components available in the service. For each component includes information about component type, component role, component name, component identifier, component protection flag. |
| | | @componentType | 1 | unsignedByte | Attribute indicates the type of this component. Value of 0 indicates an audio component. Value of 1 indicates a video component. Value of 2 indicated a closed caption component. Value of 3 indicates an application component. Values 4 to 7 are reserved. |
| | | @componentRole | 1 | unsignedByte | Attribute indicates the role or kind of this component. For audio (when componentType attribute above is equal to 0): values of componentRole attribute are as follows: 0 = Complete main, 1 = Music and Effects, 2 = Dialog, 3 = Commentary, 4 = Visually Impaired, 5 = Hearing Impaired, 6 = Voice-Over, 7-254 = reserved, 255 = unknown. For Video (when componentType attribute above is equal to 1) values of componentRole attribute are as follows: 0 = Primary video, 1= Alternative camera view, 2 = Other alternative video component, 3 = Sign language inset, 4 = Follow subject video, 5 = 3D video left view, 6 = 3D video right view, 7 = 3D video depth information, 8 = Part of video array <x,y> of <n,m>, 9 = Follow-Subject metadata, 10-254 = reserved, 255 = unknown. For Closed Caption component (when componentType attribute above is equal to 2) values of componentRole attribute are as follows: 0 = Normal, 1 = Easy reader, 2-254 = reserved, 255 = unknown. When componentType attribute above is between 3 to 7, inclusive, the componentRole shall be equal to 255. |
| | | @componentProtectedFlag | 0..1 | boolean | Attribute indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. |
| | | @componentId | 1 | unsignedByte | Attribute indicates the identifier of this component. The componentId shall be unique within the service. |
| | | @componentName | 0..1 | String | Attribute indicates the human readable name of this component. |

FIG. 15

| Element or Attribute (@) Name | Cardinality | Data Type | Description |
|---|---|---|---|
| fichannel | | | Root element of the fast information channel information or user service bundle description |
| Service | 1...N | | ATSC service description |
|   Channel | 1 | | Contains information about the channel in the service (or about this service). |
|     @majorChannelNo | 1 | unsignedShort | Attribute indicates the major channel number of the service. |
|     @minorChannelNo | 1 | unsignedShort | Attribute indicates the minor channel number of the service. |
|     @serviceLang | 0..1 | String | Attribute indicates the primary language used in the service. Semantics of xml:lang shall be followed. |
|     @serviceGenre | 0..1 | unsignedByte | Attribute indicates primary genre of the service. This attribute shall be instantiated to describe the genre category for the service. The <classificationSchemeURI> is http://www.atsc.org/XMLSchemas/mh/2009/1.0/genre-cs/ and the value of serviceGenre shall matche a termID value from the classification schema in Annex B of A/153 Part 4 document titled "ATSC-Mobile DTV Standard, Part 4 – Announcement" available at http://www.atsc.org which is incorporated in its entirety here by reference. |
|     @serviceIcon | 1 | anyURI | Attribute indicates the Uniform Resource Locator (URL) for the icon used to represent this service. |
|   ServiceDescription | 0..N | | Contains service description possibly in multiple languages. |
|     @serviceDescrText | 1 | String | Attribute indicates description of the service. |
|     @serviceDescrLang | 0..1 | String | Attribute indicates the language of the serviceDescrText. Semantics of xml:lang shall be followed. |

FIG. 16

```
<xs:schema xmlns:xs="http://www.w3.org/2001/XMLSchema" >
<xs:element name="ComponentInfo" minOccurs="0" maxOccurs="unbounded">
    <xs:complexType>
                <xs:attribute name="componentType"
type="xs:unsignedByte" use="required"/>
                <xs:attribute name="componentRole"
type="xs:unsignedByte" use="required"/>
                <xs:attribute name="componentProtectedFlag"
type="xs:boolean" use="optional"/>
                <xs:attribute name="componentId"
type="xs:unsignedByte" use="required"/>
                <xs:attribute name="componentName" type="xs:string"
use="optional"/>
    </xs:complexType>
</xs:element>
</xs:schema>
```

FIG. 17

```
<xs:schema xmlns:xs="http://www.w3.org/2001/XMLSchema" >
    <xs:element name="Channel">
        <xs:complexType>
            <xs:simplecontent>
                <xs:attribute name="majorChannelNo" type="xs:unsignedByte" use="required"/>
                <xs:attribute name="minorChannelNo" type="xs:unsignedByte" use="required"/>
                <xs:attribute name="serviceLang" type="xs:string" use="optional"/>
                <xs:attribute name="serviceLang" type="xs:string" use="optional"/>
                <xs:attribute name="serviceGenre" type="xs:unsignedByte" use="optional"/>
                <xs:attribute name="serviceIcon" type="xs:anyURI" use="required"/>
                <xs:attribute name="serviceLang" type="xs:string" use="optional"/>
            </xs:simplecontent>
            <xs:element name="ServiceDescription" type="ServiceDescriptionType" minOccurs="1" maxOccurs="unbounded"/>

</xs:complexType>
    </xs:element>

<xs:complexType name="ServiceDescriptionType">
        <xs:attribute name="serviceDescrText" type="xs:string" use="required"/>
        <xs:attribute name="serviceDescrLang" type="xs:string" use="optional"/>
    </xs:complexType>
</xs:schema>
```

FIG. 18

| Element or Attribute Name | | | | Use | Description |
|---|---|---|---|---|---|
| bundleDescription | | | | | Root element of the User Service Bundle Description. |
| | userServiceDescription | | | | A single instance of an ATSC 3.0 Service. |
| | | @serviceId | | M | A globally unique URI that identifies the ATSC 3.0 Service, unique within the scope of the BSID. This parameter is used to link the service to service guide. |
| | | @llsServiceId | | M | Reference to corresponding service entry in service list table. Service list table is a table of signaling information which is used to build a basic service listing and provide bootstrap discovery of service layer signaling. The value of this attribute is the same as value of serviceId assigned to the service in the service list table. |
| | | Name | | 0..N | Name of the ATSC 3.0 service as given by the lang attribute. |
| | | | @lang | 1 | Language of the ATSC 3.0 service name. The language shall be specified according to XML datatypes described in XML Schema Part 2 document : "XML Schema Part 2: Datatypes Second Edition," W3C Recommendation, http://www.w3.org/TR/xmlschema-2/. |
| | | serviceLanguage | | 0..N | Available languages of the ATSC 3.0 service. The language shall be specified according to XML datatypes described in XML Schema Part 2 document : "XML Schema Part 2: Datatypes Second Edition," W3C Recommendation, http://www.w3.org/TR/xmlschema-2/ 28 October 2004 |
| | | contentAdvisoryRating | | 0..1 | Specifies the content advisory rating, as defined in the ATSC 3.0 service announcement or service guide. The format of this element shall be identical to the ContentAdvisoryRatings element specified in the Service fragment of the ATSC 3.0 Service Announcement. The XML schema in FIG. 20 and FIG. 22 described this format inside this element. |
| | | Channel | | 1 | Contains information about the service |
| | | | @serviceGenre | 0..1 | Attribute indicates primary genre of the service. This attribute shall be instantiated to describe the genre category for the service. The <classificationSchemeURI> is http://www.atsc.org/XMLSchemas/mh/2009/1.0/genre-cs/ and the value of serviceGenre shall matches a termID value from the classification schema in Annex B of A/153 Part 4: "ATSC- Mobile DTV Standard, Part 4: Announcement", Advanced Television Systems Committee, October 2009. |
| | | | @serviceIcon | 0..1 | Attribute indicates the Uniform Resource Locator (URL) for the icon used to represent this service. |
| | | | ServiceDescription | 0..N | Contains service description possibly in multiple languages. |
| | | | | @serviceDescrText | 1 | Attribute indicates description of the service. |
| | | | | @serviceDescrLang | 0..1 | Attribute indicates the language of the serviceDescrText. Semantics of xml:lang described in XML Schema Part 2 document : "XML Schema Part 2: Datatypes Second Edition," W3C Recommendation, http://www.w3.org/TR/xmlschema-2/ shall be followed. |
| | | mpuComponent | | 0..1 | A description about the contents components of ATSC 3.0 Service delivered as MPUs |

FIG. 19A

| @mmtPackageId | 1 | Reference to a MMT Package for content components of the ATSC 3.0 Service delivered as MPUs. |
|---|---|---|
| @nextMmtPackageId | 0..1 | Reference to a MMT Package to be used after the one referenced by @mmtPackageId in time for content components of the ATSC 3.0 Service delivered as MPUs. |
| routeComponent | 0..1 | A description about the contents components of ATSC 3.0 Service delivered by ROUTE. |
| @sTSIDUri | 1 | Reference to the Service-based Transport Session Instance Description (S-TSID) fragment. The S-TSID fragment provides access related parameters to the transport sessions carrying contents of this ATSC 3.0 Service. |
| @sTSIDPlpId | 0..1 | A string representing a)n integer number indicating the PLP identifier (ID of the physical layer pipe carrying the S-TSID for this service. The default value for this attribute may be current physical layer pipe. |
| @sTSIDDestinationIpAddress | 0..1 | A string containing the dotted-IPv4 destination address of the packets carrying S-TSID for this service. The default value for this attribute may be current MMTP session's source IP address. The term dotted-IPv4 represents a presentation format for Internet Protocol Version 4 address data. It consists of a string of decimal numbers, each pair separated by a dot (full stop or period). |
| @sTSIDDestinationUdpPort | 1 | A string containing the port number of the packets carrying S-TSID for this service. |
| @sTSIDSourceIpAddress | 1 | A string containing the dotted-IPv4 source address of the packets carrying S-TSID for this service. |
| @sTSIDMajorProtocolVersion | 0..1 | Major version number of the protocol used to deliver the S-TSID for this service. Default value is 1. |
| @sTSIDMinorProtocolVersion | 0..1 | Minor version number of the protocol used to deliver the S-TSID for this service. Default value is 0. |
| broadbandComponent | 0..1 | A description about the contents components of ATSC 3.0 Service delivered by broadband. |
| @fullMPDUri | 1 | Reference to a Media presentation description (MPD) fragment which contains descriptions for contents components of the ATSC 3.0 Service delivered over broadband. The MPEG-DASH Media Presentation Description (MPD) is an XML document containing information about media segments, their relationships and information necessary to choose between them, and other metadata that may be needed by clients. It is defined in ISO/IEC 23009-1: Information technology — Dynamic adaptive streaming over HTTP (DASH) — Part 1: Media presentation description and segment formats |
| ComponentInfo | 1..N | Contains information about components available in the service. For each component includes information about component type, component role, component name, component identifier, component protection flag. |
| @componentType | 1 | Attribute indicates the type of this component. Value of 0 indicates an audio component. Value of 1 indicates a video component. Value of 2 indicates a closed caption component. Values 3 to 7 are reserved. |

FIG. 19B

| @componentRole | 1 | Attribute indicates the role or kind of this component. For audio (when componentType attribute above is equal to 0): values of componentRole attribute are as follows: 0 = Complete main, 1 = Music and Effects, 2 = Dialog, 3 = Commentary, 4 = Visually Impaired, 5 = Hearing Impaired, 6 = Voice-Over, 7-254= reserved, 255 = unknown. For Video (when componentType attribute above is equal to 1) values of componentRole attribute are as follows: 0 = Primary video, 1-254 = reserved, 255 = unknown. For Closed Caption component (when componentType attribute above is equal to 2) values of componentRole attribute are as follows: 0 = Normal, 1 = Easy reader, 2-254 = reserved, 255 = unknown. When componentType attribute above is between 3 to 7, inclusive, the componentRole shall be equal to 255. |
|---|---|---|
| @componentProtectedFlag | 0..1 | Attribute indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. |
| @componentId | 1 | Attribute indicates the identifier of this component. The value of this attribute shall be the same as the asset identifier (e.g. asset_id in the MP table in ISO/IEC: ISO/IEC 23008-1) corresponding to this component |
| @componentName | 0..1 | Attribute indicates the human readable name of this component. |

FIG. 19C

```xml
<?xml version="1.0" encoding="UTF-8"?>
<xs:schema xmlns:xs="http://www.w3.org/2001/XMLSchema"
    xmlns:mmtusd="http://www.atsc.org/XMLSchemas/ATSC3/Delivery/MMTUSD/1.0/"
    targetNamespace="http://www.atsc.org/XMLSchemas/ATSC3/Delivery/MMTUSD/1.0/"
    elementFormDefault="qualified"
    attributeFormDefault="qualified">
    <xs:import namespace="http://www.w3.org/XML/1998/namespace"
        schemaLocation="http://www.w3.org/2001/xml.xsd"/>
    <xs:element name="bundleDescription" type="mmtusd:BundleDescrType"/>
    <xs:complexType name="BundleDescrType">
        <xs:sequence>
            <xs:element name="userServiceDescription"
type="mmtusd:UserServiceDescrType" minOccurs="1"
                maxOccurs="1"/>
        </xs:sequence>
    </xs:complexType>
    <xs:complexType name="UserServiceDescrType">
        <xs:sequence>
            <xs:element name="Name" minOccurs="0" maxOccurs="unbounded">
                <xs:complexType>
                    <xs:simpleContent>
                        <xs:extension base="xs:string">
                            <xs:attribute ref="xml:lang" use="required"/>
                        </xs:extension>
                    </xs:simpleContent>
                </xs:complexType>
            </xs:element>
            <xs:element name="serviceLanguage" type="xs:string" minOccurs="0"
maxOccurs="unbounded"/>
            <xs:element name="ContentAdvisoryRatings"
type="mmtusd:CARatingType" minOccurs="0" maxOccurs="1"/>
            <xs:element name="Channel">
                <xs:complexType>
                    <xs:sequence>
                        <xs:element name="ServiceDescription"
type="mmtusd:ServiceDescriptionType" minOccurs="0" maxOccurs="unbounded"/>
                    </xs:sequence>
                    <xs:attribute name="serviceGenre" type="xs:unsignedByte"
use="optional"/>
                    <xs:attribute name="serviceIcon" type="xs:anyURI"
use="required"/>
                </xs:complexType>
            </xs:element>
            <xs:element name="mpuComponent" type="mmtusd:MPUComponentType"
minOccurs="0" maxOccurs="1"/>
            <xs:element name="routeComponent" type="mmtusd:RouteComponentType"
minOccurs="0" maxOccurs="1"/>
            <xs:element name="broadbandComponent"
type="mmtusd:BroadbandComponentType" minOccurs="0" maxOccurs="1"/>
            <xs:element name="ComponentInfo" type="mmtusd:ComponentInfoType"
minOccurs="1" maxOccurs="unbounded"/>
        </xs:sequence>
        <xs:attribute name="serviceId" type="xs:anyURI" use="required"/>
        <xs:attribute name="llsServiceId" type="xs:unsignedShort"
```

FIG. 20A

```
use="required"/>
    </xs:complexType>

<xs:simpleType name="PLPIdType">
        <xs:restriction base="xs:unsignedByte">
            <xs:maxInclusive value="63"/>
        </xs:restriction>
    </xs:simpleType>
    <xs:simpleType name="AddressType">
        <xs:restriction base="xs:token">
            <xs:pattern
                value="(([0-9]|[1-9][0-9]|1[0-9][0-9]|2[0-4][0-9]|25[0-5])\.){3}([0-9]|[1-9][0-9]|1[0-9][0-9]|2[0-4][0-9]|25[0-5])"
            />
        </xs:restriction>
    </xs:simpleType>
    <xs:simpleType name="PortType">
        <xs:restriction base="xs:unsignedShort">
            <xs:minInclusive value="1"/>
        </xs:restriction>
    </xs:simpleType>
    <xs:complexType name="MPUComponentType">
        <xs:attribute name="mmtPackageId" type="xs:string" use="required"/>
        <xs:attribute name="nextMmtPackageId" type="xs:string" use="optional"/>
    </xs:complexType>
    <xs:complexType name="RouteComponentType">
        <xs:attribute name="sTSIDUri" type="xs:anyURI" use="required"/>
        <xs:attribute name="sTSIDPlpId" type="mmtusd:PLPIdType"
use="optional"/>
        <xs:attribute name="sTSIDDestinationIpAddress"
type="mmtusd:AddressType" use="optional"/>
        <xs:attribute name="sTSIDDestinationUdpPort" type="mmtusd:PortType"
use="required"/>
        <xs:attribute name="sTSIDSourceIpAddress" type="mmtusd:AddressType"
use="required"/>
        <xs:attribute name="sTSIDMajorProtocolVersion" type="xs:unsignedByte"
use="optional" default="1"/>
        <xs:attribute name="sTSIDMinorProtocolVersion" type="xs:unsignedByte"
use="optional" default="0"/>
    </xs:complexType>
    <xs:complexType name="BroadbandComponentType">
        <xs:attribute name="fullMPDUri" type="xs:anyURI" use="required"/>
    </xs:complexType>
    <xs:complexType name="ServiceDescriptionType">
        <xs:attribute name="serviceDescrText" type="xs:string" use="required"/>
        <xs:attribute name="serviceDescrLang" type="xs:string" use="optional"/>
    </xs:complexType>
    <xs:complexType name="CARatingType">
        <xs:sequence>
            <xs:element name="RegionIdentifier" type="xs:unsignedByte"
```

FIG. 20B

```
                   minOccurs="0" maxOccurs="1"/>
                <xs:element name="RatingDescription" maxOccurs="1">
                    <xs:complexType>
                        <xs:simpleContent>
                            <xs:extension base="xs:string">
                                <xs:attribute ref="xml:lang" use="optional"
default="en"/>
                            </xs:extension>
                        </xs:simpleContent>
                    </xs:complexType>
                </xs:element>
                <xs:element name="RatedDimensions" type="xs:unsignedByte"
minOccurs="0" maxOccurs="1"/>
                <xs:element name="RatingDimVal" type="mmtusd:RatingDimValType"
minOccurs="1"
                    maxOccurs="unbounded"/>
            </xs:sequence>
        </xs:complexType>
        <xs:complexType name="RatingDimValType">
            <xs:sequence>
                <xs:element name="RatingDimension" type="xs:unsignedByte"
minOccurs="0" maxOccurs="1"/>
                <xs:element name="RatingValueString" type="xs:string"
minOccurs="1"/>
            </xs:sequence>
        </xs:complexType>
        <xs:complexType name="ComponentInfoType">
            <xs:attribute name="componentType" type="xs:unsignedByte"
use="required"/>
            <xs:attribute name="componentRole" type="xs:unsignedByte"
use="required"/>
            <xs:attribute name="componentProtectedFlag" type="xs:boolean"
use="optional" default="false"/>
            <xs:attribute name="componentId" type="xs:string" use="required"/>
            <xs:attribute name="componentName" type="xs:string" use="optional"/>
        </xs:complexType>
</xs:schema>
```

FIG. 20C

```xml
<?xml version="1.0" encoding="UTF-8"?>
<xs:schema xmlns:xs="http://www.w3.org/2001/XMLSchema"
    xmlns:mmtusd="http://www.atsc.org/XMLSchemas/ATSC3/Delivery/MMTUSD/1.0/"
    xmlns:slt="http://www.atsc.org/XMLSchemas/ATSC3/Delivery/SLT/1.0/"
    targetNamespace="http://www.atsc.org/XMLSchemas/ATSC3/Delivery/MMTUSD/1.0/"
    elementFormDefault="qualified"
    attributeFormDefault="qualified">
    <xs:import namespace="http://www.w3.org/XML/1998/namespace"
        schemaLocation="http://www.w3.org/2001/xml.xsd"/>
    <xs:import schemaLocation="SLT.xsd"
        namespace="http://www.atsc.org/XMLSchemas/ATSC3/Delivery/SLT/1.0/"/>
    <xs:element name="bundleDescription" type="mmtusd:BundleDescrType"/>
    <xs:complexType name="BundleDescrType">
        <xs:sequence>
            <xs:element name="userServiceDescription"
type="mmtusd:UserServiceDescrType" minOccurs="1"
                maxOccurs="1"/>
        </xs:sequence>
    </xs:complexType>
    <xs:complexType name="UserServiceDescrType">
        <xs:sequence>
            <xs:element name="Name" minOccurs="0" maxOccurs="unbounded">
                <xs:complexType>
                    <xs:simpleContent>
                        <xs:extension base="xs:string">
                            <xs:attribute ref="xml:lang" use="required"/>
                        </xs:extension>
                    </xs:simpleContent>
                </xs:complexType>
            </xs:element>
            <xs:element name="serviceLanguage" type="xs:string" minOccurs="0"
maxOccurs="unbounded"/>
            <xs:element name="ContentAdvisoryRatings"
type="mmtusd:CARatingType" minOccurs="0" maxOccurs="1"/>
            <xs:element name="Channel">
                <xs:complexType>
                    <xs:sequence>
                        <xs:element name="ServiceDescription"
type="mmtusd:ServiceDescriptionType" minOccurs="0" maxOccurs="unbounded"/>
                    </xs:sequence>
                    <xs:attribute name="serviceGenre" type="xs:unsignedByte"
use="optional"/>
                    <xs:attribute name="serviceIcon" type="xs:anyURI"
use="required"/>
                </xs:complexType>
            </xs:element>
            <xs:element name="mpuComponent" type="mmtusd:MPUComponentType"
minOccurs="0" maxOccurs="1"/>
            <xs:element name="routeComponent" type="mmtusd:RouteComponentType"
minOccurs="0" maxOccurs="1"/>
            <xs:element name="broadbandComponent"
type="mmtusd:BroadbandComponentType" minOccurs="0" maxOccurs="1"/>
            <xs:element name="ComponentInfo" type="mmtusd:ComponentInfoType"
```

FIG. 22A

```
minOccurs="1" maxOccurs="unbounded"/>
        </xs:sequence>
        <xs:attribute name="serviceId" type="xs:anyURI" use="required"/>
        <xs:attribute ref="slt:serviceId" use="required"/>
    </xs:complexType>

<xs:simpleType name="PLPIdType">
        <xs:restriction base="xs:unsignedByte">
            <xs:maxInclusive value="63"/>
        </xs:restriction>
    </xs:simpleType>
    <xs:simpleType name="AddressType">
        <xs:restriction base="xs:token">
            <xs:pattern
                value="(([0-9]|[1-9][0-9]|1[0-9][0-9]|2[0-4][0-9]|25[0-5])\.){3}([0-9]|[1-9][0-9]|1[0-9][0-9]|2[0-4][0-9]|25[0-5])"
                />
        </xs:restriction>
    </xs:simpleType>
    <xs:simpleType name="PortType">
        <xs:restriction base="xs:unsignedShort">
            <xs:minInclusive value="1"/>
        </xs:restriction>
    </xs:simpleType>
    <xs:complexType name="MPUComponentType">
        <xs:attribute name="mmtPackageId" type="xs:string" use="required"/>
        <xs:attribute name="nextMmtPackageId" type="xs:string" use="optional"/>
    </xs:complexType>
    <xs:complexType name="RouteComponentType">
        <xs:attribute name="sTSIDUri" type="xs:anyURI" use="required"/>
        <xs:attribute name="sTSIDPlpId" type="mmtusd:PLPIdType"
use="optional"/>
        <xs:attribute name="sTSIDDestinationIpAddress"
type="mmtusd:AddressType" use="optional"/>
        <xs:attribute name="sTSIDDestinationUdpPort" type="mmtusd:PortType"
use="required"/>
        <xs:attribute name="sTSIDSourceIpAddress" type="mmtusd:AddressType"
use="required"/>
        <xs:attribute name="sTSIDMajorProtocolVersion" type="xs:unsignedByte"
use="optional" default="1"/>
        <xs:attribute name="sTSIDMinorProtocolVersion" type="xs:unsignedByte"
use="optional" default="0"/>
    </xs:complexType>
    <xs:complexType name="BroadbandComponentType">
        <xs:attribute name="fullMPDUri" type="xs:anyURI" use="required"/>
    </xs:complexType>
    <xs:complexType name="ServiceDescriptionType">
        <xs:attribute name="serviceDescrText" type="xs:string" use="required"/>
        <xs:attribute name="serviceDescrLang" type="xs:string" use="optional"/>
    </xs:complexType>
    <xs:complexType name="CARatingType">
        <xs:sequence>
            <xs:element name="RegionIdentifier" type="xs:unsignedByte"
```

FIG. 22B

```
                minOccurs="0" maxOccurs="1"/>
            <xs:element name="RatingDescription" maxOccurs="1">
                <xs:complexType>
                    <xs:simpleContent>
                        <xs:extension base="xs:string">
                            <xs:attribute ref="xml:lang" use="optional" default="en"/>
                        </xs:extension>
                    </xs:simpleContent>
                </xs:complexType>
            </xs:element>
            <xs:element name="RatedDimensions" type="xs:unsignedByte" minOccurs="0" maxOccurs="1"/>
            <xs:element name="RatingDimVal" type="mmtusd:RatingDimValType" minOccurs="1"
                maxOccurs="unbounded"/>
        </xs:sequence>
    </xs:complexType>
    <xs:complexType name="RatingDimValType">
        <xs:sequence>
            <xs:element name="RatingDimension" type="xs:unsignedByte" minOccurs="0" maxOccurs="1"/>
            <xs:element name="RatingValueString" type="xs:string" minOccurs="1"/>
        </xs:sequence>
    </xs:complexType>
    <xs:complexType name="ComponentInfoType">
        <xs:attribute name="componentType" type="xs:unsignedByte" use="required"/>
        <xs:attribute name="componentRole" type="xs:unsignedByte" use="required"/>
        <xs:attribute name="componentProtectedFlag" type="xs:boolean" use="optional" default="false"/>
        <xs:attribute name="componentId" type="xs:string" use="required"/>
        <xs:attribute name="componentName" type="xs:string" use="optional"/>
    </xs:complexType>
</xs:schema>
```

FIG. 22C

| Element or Attribute Name | Use | Data Type | Description |
|---|---|---|---|
| bundleDescription | | | Root element of the User Service Bundle Description. |
| userServiceDescription | | | A single instance of an ATSC 3.0 Service. |
| @globalServiceID | 1 | anyURI | A globally unique URI that identifies the ATSC 3.0 Service, unique within the scope of a broadcast stream. |
| @serviceId | 1 | unsignedShort | Service identifier for this service in service list table. |
| @serviceStatus | 0..1 | boolean | Specify the status of this service. The value indicates whether this service is active or inactive. When set to "1" (true), that indicates service is active. Shall default to 1 when not present. |
| @fullMPDUri | 1 | anyURI | Reference to a Media Presentation Description (MPD) fragment which contains descriptions for contents components of the ATSC 3.0 Service delivered over broadcast and optionally, also over broadband. MPD is further described in "ISO/ IEC 23009-1 Dynamic adaptive streaming over HTTP (DASH) – Part 1: Media presentation description and segment formats". |
| @sTSIDUri | 1 | anyURI | Reference to the S-TSID fragment which provides access related parameters to the Transport sessions carrying contents of this ATSC 3.0 Service. S-TSID fragment is further described in FIG. 25. |
| name | 0..N | string | Name of the ATSC 3.0 service as given by the lang attribute |
| @lang | 1 | language | Language of the ATSC 3.0 service name. The language shall be specified according to XML datatypes (XML Schema Part 2) defined at "XML Schema Part 2: Datatypes Second Edition," W3C Recommendation, http://www.w3.org/TR/xmlschema-2/ 28 October 2004 |
| serviceLanguage | 0..N | language | Available languages of the ATSC 3.0 service. The language shall be specified according to XML datatypes (XML Schema Part 2) defined at "XML Schema Part 2: Datatypes Second Edition," W3C Recommendation, http://www.w3.org/TR/xmlschema-2/ 28 October 2004 |
| capabilityCode | 0..1 | string | Specifies the capabilities and capability groups, required in the receiver to be able to create a meaningful presentation of the content of this ATSC service. |
| deliveryMethod | 1..N | | Container of transport related information pertaining to the contents of the service over broadcast and (optionally) broadband modes of access. |
| broadcastAppService | 1..N | | A DASH representation delivered over broadcast, in multiplexed or non-multiplexed form, containing the corresponding media component(s) belonging to the ATSC 3.0 Service, across all periods of the affiliated media presentation. DASH is further described in "ISO/ IEC 23009-1 Dynamic adaptive streaming over HTTP (DASH) – Part 1: Media presentation description and segment formats". |

FIG.23A

| | | | |
|---|---|---|---|
| basePattern | 1..N | string | A character pattern for use by the ATSC receiver to match against any portion of the segment URL used by the DASH client to request media segments of a parent representation under its containing period. A match implies that the corresponding requested media segment is carried over broadcast transport. |
| unicastAppService | 0..N | | A DASH representation delivered over broadband, in multiplexed or non-multiplexed form, containing the constituent media content component(s) belonging to the ATSC 3.0 Service, across all periods of the affiliated media presentation. |
| basePattern | 1..N | string | A character pattern for use by the ATSC receiver to match against any portion of the segment URL used by the DASH client to request media segments of a parent representation under its containing period. A match implies that the corresponding requested media segment is carried over broadband transport. |

FIG. 23 B

```xml
<?xml version="1.0" encoding="UTF-8"?>
<xs:schema xmlns:xs="http://www.w3.org/2001/XMLSchema"
   xmlns:routeusd="http://www.atsc.org/XMLSchemas/ATSC3/Delivery/ROUTEUSD/1.0/"
   targetNamespace="http://www.atsc.org/XMLSchemas/ATSC3/Delivery/ROUTEUSD/1.0/"
   elementFormDefault="qualified"
   attributeFormDefault="qualified">
   <xs:import namespace="http://www.w3.org/XML/1998/namespace"
      schemaLocation="http://www.w3.org/2001/xml.xsd"/>
   <xs:element name="bundleDescription" type="routeusd:BundleDescriptionType"/>
   <xs:complexType name="BundleDescriptionType">
      <xs:sequence>
         <xs:element name="userServiceDescription" type="routeusd:UserServiceDescriptionType" minOccurs="1" maxOccurs="1"/>
      </xs:sequence>
   </xs:complexType>
   <xs:complexType name="UserServiceDescriptionType">
      <xs:sequence>
         <xs:element name="name" minOccurs="0" maxOccurs="unbounded">
            <xs:complexType>
                <xs:attribute name="lang" type="xs:language" use="required"/>
            </xs:complexType>
         </xs:element>
         <xs:element name="serviceLanguage" type="xs:language" minOccurs="0" maxOccurs="unbounded"/>
         <xs:element name="capabilityCode" type="xs:string" minOccurs="0" maxOccurs="1"/>
         <xs:element name="deliveryMethod" type="routeusd:deliveryMethodType" minOccurs="1" maxOccurs="unbounded"/>
      </xs:sequence>
      <xs:attribute name="globalserviceId" type="xs:anyURI" use="required"/>
      <xs:attribute name="serviceId" type="xs:unsignedShort" use="required"/>
      <xs:attribute name="serviceStatus" type="xs:boolean" use="optional" default="true"/>
      <xs:attribute name="fullMPDUri" type="xs:anyURI" use="required"/>
      <xs:attribute name="sTSIDUri" type="xs:anyURI" use="required"/>
   </xs:complexType>
   <xs:complexType name="deliveryMethodType">
      <xs:sequence>
         <xs:element name="broadcastAppService" type="routeusd:AppServiceType" minOccurs="1" maxOccurs="unbounded"/>
         <xs:element name="unicastAppService" type="routeusd:AppServiceType" minOccurs="0" maxOccurs="unbounded"/>
      </xs:sequence>
   </xs:complexType>
   <xs:complexType name="AppServiceType">
      <xs:sequence>
         <xs:element name="basePattern" type="xs:string" minOccurs="1" maxOccurs="unbounded"/>
      </xs:sequence>
   </xs:complexType>
</xs:schema>
```

FIG. 24

| Element and Attribute Names | Use | Data Type | Description |
|---|---|---|---|
| S-TSID | | | Service Transport Session Instance Description |
|   @serviceId | 0..1 | unsignedShort | Reference to corresponding service element in the ROUTE USBD. The value of this attribute shall reference a service with a corresponding value of serviceId. |
|   RS | 1..N | rSessionType | ROUTE session |
|     @bsid | 0..1 | unsignedShort | Identifier of the broadcast stream within which the content component(s) are carried. When this attribute is absent, the default broadcast stream is the one whose PLPs carry SLS fragments for this ATSC 3.0 service. |
|     @sIpAddr | 0..1 | String (AddressType) | Source IP address (default: current ROUTE session's source IP address) |
|     @dIpAddr | 0..1 | String (AddressType) | Destination IP address (default: current ROUTE session's destination IP address) |
|     @dport | 0..1 | unsignedShort (portType) | Destination port (default: current ROUTE session's destination port) |
|     @PLPID | 0..1 | unsignedByte (PLPIdType) | Physical Layer Pipe ID for ROUTE session (default: current physical layer pipe). PLP_ID shall be as specified A/322 "ATSC 3.0 Physical Layer Downlink Standard" available at http://atsc.org/candidate-standard/a322-atsc-candidate-standard-physical-layer-protocol/ |
|     LS | 1..N | | LCT Session |
|       @tsi | 1 | unsignedInt | TSI value |
|       @PLPID | 0..1 | unsignedByte (PLPIdType) | PLP ID (overrides default ROUTE session value) |
|       @bw | 0..1 | unsignedInt | Maximum bandwidth |
|       @startTime | 0..1 | dateTime | Start time |
|       @endTime | 0..1 | dateTime | End time |
|       SrcFlow | 0..1 | srcFlowType | Source Flow as defined in FIG. 26 |
|       RepairFlow | 0..1 | rprFlowType | Repair Flow as defined in FIG. 28 |

FIG. 25

| Element or Attribute Name | Use | Data Type | Description |
|---|---|---|---|
| SrcFlow | | srcFlowType | Source flow carried in the LCT session. |
| @rt | 0..1 | boolean | If @rt is not present, it is assumed false. Shall be present and set to "true" when the SrcFlow carries streaming media.<br>Default value: false |
| @minBuffsize | 0..1 | unsignedInt | Defines the minimum number of kilobytes required in the receiver transport buffer for the LCT session. This value may be present if @rt is set to true. |
| EFDT | 0..1 | efdtType | The extended file delivery table (EFDT) instance. EFDT is described further in FIG. 27. |
| ContentInfo | 0..1 | string | May provide additional information that can be mapped to the application service that is carried in this transport session. |
| Payload | 1..N | payloadType | Information on the payload of ROUTE packets carrying the objects of the source flow. |
| @codePoint | 0..1 | unsignedByte | A numerical representation of the combination of values specified for the child elements and attributes of the Payload element.<br>Default value = "0" |
| @formatID | 1 | unsignedByte | Specifies the payload format of the delivery object. |
| @frag | 0..1 | unsignedByte | This attribute contains an unsignedByte value indicating how the payload of ROUTE packets carrying the objects of the source flow are fragmented for delivery.<br><br>0: indicates arbitrary fragmentation. This value means that the payload of this ROUTE packet carries a contiguous portion of the delivery object whose fragmentation occurs at arbitrary byte boundaries.<br><br>1: indicates application specific fragmentation. This value means that the payload of this ROUTE packet carries media data in the form of one or more complete samples, where the term "sample" is as defined in ISO/IEC 14496-12. "ISO/IEC 14496-12 : Information technology -- Coding of audio-visual objects -- Part 12: ISO base media file format," is available at http://www.iso.org/iso/catalogue_detail.htm?csnumber=61988<br><br>2: This value means that the payload of this ROUTE packet contains the entire data content of one or more boxes, where term "box" is as defined in ISO/IEC 14496-12.<br><br>3-127: reserved for future use<br>128-255: reserved for proprietary use<br>Default value = "0" |
| @order | 0..1 | unsignedByte | This attribute contains an unsignedByte value indicating whether and how the payload of ROUTE packets carrying the objects of the source flow as DASH Segments are delivered in the order of their generation by the DASH encoder.<br><br>Default value = "0" |
| @srcFecPayloadID | 0..1 | unsignedByte | Defines values of the Source FEC Payload ID. The meaning of values is defined as follows:<br>• 0: the source FEC payload identifier is absent and the entire delivery object is contained in this packet.<br>• 1: the source FEC payload identifier is a 32-bit unsigned integer value<br>• 2: the FECParams child element of SrcFlow defines the Format of the Source FEC Payload identifier.<br>Default value = "1" |
| FECParams | 0..1 | fecParamType | Defines the parameters of the FEC scheme associated with the source flow, in the form of FEC Object Transmission Information as defined in IETF RFC 5052.<br>IETF RFC 5052 "Forward Error Correction (FEC) Building Block" is available at https://tools.ietf.org/rfc/rfc5052.txt |

FIG. 26

| Element or Attribute Name | Use | Data Type | Description |
|---|---|---|---|
| EFDT | | efdtType | If provided, it specifies the details of the file delivery data in the form of the Extended FDT instance which includes instance parameters. |
| @tsi | 0..1 | unsignedInt | TSI of the LCT session carrying the referenced EFDT. |
| @idRef | 0..1 | anyURI | Identification of the EFDT in the form of a URI when the EFDT is delivered in-band with the source flow as a referenced delivery object. |
| @version | 0..1 | unsignedInt | Version of this Extended FDT instance descriptor. The version if increased by one when the descriptor is updated. The received EFDT with highest version number is the currently valid version. |
| @maxExpiresDelta | 0..1 | unsignedInt | Time interval in number of integer seconds, which when added to the wall-clock time at the receiver when it acquires the first ROUTE packet carrying the object described by this EFDT, shall represent the expiration time of the associated EFDT. |
| @maxTransportSize | 0..1 | unsignedInt | The maximum transport size of any object described by this EFDT. |
| FileTemplate | 0..1 | string | Specifies the file URL or a template format for the derivation of the file URI. |
| FDTParameters | 0..1 | string | Parameters for file delivery table. |

| Element or Attribute Name | Use | Data type | Description |
|---|---|---|---|
| RprFlow | | rprFlowType | Repair flow carried in the LCT session referenced by signaling metadata. |
|   FECParameters | | | FEC Parameters corresponding to the repair flow. |
|     @maximumDelay | 0..1 | unsignedInt | Specifies the maximum delivery delay between any source packet in the source flow and the repair flow. Default value = 0. |
|     @overhead | 0..1 | unsignedShort (percentage) | Specifies the overhead in percentage |
|     @minBuffSize | 0..1 | unsignedInt | Specifies the required buffer size. If present then this attribute defines the minimum buffer size that is required to handle all associated objects that are assigned to a super-object. |
|     FECOTI | 1 | string | Specifies the FEC Object Transmission Information (FEC OTI) as defined in RFC 5052 FEC OTI corresponds to FEC related information associated with an object as well as FEC information associated with the encoding symbols of the object and is to be included within this declaration and applies to all repair packets with the repair flow. |
|     ProtectedObject | 0..N | protectedObjectType | Specifies the source flow(s) protected by this Repair Flow and the details on how the protection is done. It also defines how certain delivery objects of a collection of objects are included in the repair flow. |

FIG. 28

| Element or Attribute Name | Use | Data type | Description |
|---|---|---|---|
| ProtectedObject | 0..N | protectedObjectType | Specifies the source flow(s) protected by this Repair Flow and the details on how the protection is done. It also defines how certain delivery objects of a collection of objects are included in the repair flow. |
| @sessionDescription | 0..1 | string | Specifies the session description information for the source flow. If not present, the source flow is contained in the same session as the repair flow. |
| @tsi | 1 | unsignedInt | Specifies transport session identifier for the source flow to be protected. |
| @sourceTOI | 0..1 | string | Specifies the transport object identifier of the delivery object. |
| @fecTransportObjectSize | 0..1 | unsignedInt | Specifies the default size of each FEC transport object, in units of symbols. |

FIG. 29

```xml
<?xml version="1.0" encoding="UTF-8"?>
<xs:schema xmlns:xs="http://www.w3.org/2001/XMLSchema"
    xmlns:routesls="http://www.atsc.org/XMLSchemas/ATSC3/Delivery/ROUTESLS/1.0/"
    targetNamespace="http://www.atsc.org/XMLSchemas/ATSC3/Delivery/ROUTESLS/1.0/"
    elementFormDefault="qualified"
    attributeFormDefault="qualified">
    <xs:import namespace="http://www.w3.org/XML/1998/namespace"
        schemaLocation="http://www.w3.org/2001/xml.xsd"/>
    <xs:element name="S-TSID" type="routesls:STSIDType"/>
    <xs:complexType name="STSIDType">
        <xs:sequence>
            <xs:element name="RS" type="routesls:rSessionType" minOccurs="1" maxOccurs="unbounded"/>
        </xs:sequence>
        <xs:attribute name="serviceId" type="xs:unsignedShort" use="required"/>
    </xs:complexType>
    <xs:complexType name="rSessionType">
        <xs:sequence>
            <xs:element name="LS" type="routesls:lSessionType" minOccurs="1"
maxOccurs="unbounded"/>
        </xs:sequence>
        <xs:attribute name="bsid" type="xs:unsignedShort" use="optional"/>
        <xs:attribute name="sIpAddr" type="routesls:AddressType" use="optional"/>
        <xs:attribute name="dIpAddr" type="routesls:AddressType" use="optional"/>
        <xs:attribute name="dPort" type="routesls:PortType" use="optional"/>
        <xs:attribute name="PLPID" type="routesls:PLPIdType" use="optional"/>
    </xs:complexType>
    <xs:complexType name="lSessionType">
        <xs:sequence>
            <xs:element name="SrcFlow" type="routesls:srcFlowType" minOccurs="0" maxOccurs="1"/>
            <xs:element name="RprFlow" type="routesls:rprFlowType" minOccurs="0" maxOccurs="1"/>
        </xs:sequence>
        <xs:attribute name="tsi" type="xs:unsignedInt" use="required"/>
        <xs:attribute name="PLPID" type="routesls:PLPIdType" use="optional"/>
        <xs:attribute name="bw" type="xs:unsignedInt" use="optional"/>
        <xs:attribute name="startTime" type="xs:dateTime" use="optional"/>
        <xs:attribute name="endTime" type="xs:dateTime" use="optional"/>
    </xs:complexType>
    <xs:simpleType name="PLPIdType">
        <xs:restriction base="xs:unsignedByte">
            <xs:maxInclusive value="63"/>
        </xs:restriction>
    </xs:simpleType>
    <xs:simpleType name="AddressType">
        <xs:restriction base="xs:token">
            <xs:pattern
                value="(([0-9]|[1-9][0-9]|1[0-9][0-9]|2[0-4][0-9]|25[0-5])\.){3}([0-9]|[1-9][0-9]|1[0-9][0-9]|2[0-4][0-9]|25[0-5])"
            />
        </xs:restriction>
    </xs:simpleType>
    <xs:simpleType name="PortType">
        <xs:restriction base="xs:unsignedShort">
            <xs:minInclusive value="1"/>
```

FIG.30A

```
          </xs:restriction>
       </xs:simpleType>

<xs:complexType name="srcFlowType">
          <xs:sequence>
             <xs:element name="EFDT" type="routesls:efdtType" minOccurs="0" maxOccurs="1"/>
             <xs:element name="ContentInfo" type="xs:string" minOccurs="0" maxOccurs="1"/>
             <xs:element name="Payload" type="routesls:payloadType" minOccurs="0" maxOccurs="1"/>
          </xs:sequence>
          <xs:attribute name="rt" type="xs:boolean" use="optional" default="false"/>
          <xs:attribute name="minBuffSize" type="xs:unsignedInt" use="optional"/>
       </xs:complexType>
       <xs:complexType name="payloadType">
          <xs:sequence>
             <xs:element name="FECParams" type="routesls:fecParamType" minOccurs="0"
maxOccurs="1"/>
          </xs:sequence>
          <xs:attribute name="codePoint" type="xs:unsignedByte" use="optional" default="0"/>
          <xs:attribute name="formatID" type="xs:unsignedByte" use="required"/>
          <xs:attribute name="frag" type="xs:unsignedByte" use="optional" default="0"/>
          <xs:attribute name="order" type="xs:unsignedByte" use="optional" default="0"/>
          <xs:attribute name="srcFecPayloadID" type="xs:unsignedByte" use="optional" default="1"/>
       </xs:complexType>

<xs:complexType name="rprFlowType">
          <xs:sequence>
             <xs:element name="FECParameters" type="routesls:fecParametersType" minOccurs="0"
maxOccurs="1"/>
          </xs:sequence>
       </xs:complexType>
       <xs:complexType name="fecParametersType">
          <xs:sequence>
             <xs:element name="FECOTI" type="routesls:fecParamType" minOccurs="1" maxOccurs="1"/>
             <xs:element name="ProtectedObject" type="routesls:protectedObjectType" minOccurs="0"
maxOccurs="unbounded"/>
          </xs:sequence>
          <xs:attribute name="maximumDelay" type="xs:unsignedInt" use="optional" default="0"/>
          <xs:attribute name="overhead" type="routesls:percentageType" use="optional"/>
          <xs:attribute name="minBuffSize" type="xs:unsignedInt" use="optional"/>
       </xs:complexType>
       <xs:simpleType name="percentageType">
          <xs:restriction base="xs:unsignedShort">
             <xs:maxInclusive value="1000"/>
          </xs:restriction>
       </xs:simpleType>
       <xs:complexType name="protectedObjectType">
             <xs:attribute name="sessionDescription" type="xs:string" use="optional"/>
             <xs:attribute name="tsi" type="xs:unsignedInt" use="required"/>
             <xs:attribute name="sourceTOI" type="xs:string" use="optional"/>
             <xs:attribute name="fecTransportObjectSize" type="xs:unsignedInt" use="optional"/>
       </xs:complexType>

<xs:complexType name="efdtType">
          <xs:sequence>
             <xs:element name="FileTemplate" type="xs:string" minOccurs="0" maxOccurs="1"/>
```

FIG.30B

```
        <xs:element name="FDTParameters" type="xs:string" minOccurs="0" maxOccurs="1"/>
      </xs:sequence>
      <xs:attribute name="tsi" type="xs:unsignedInt" use="optional"/>
      <xs:attribute name="idRef" type="xs:anyURI" use="optional"/>
      <xs:attribute name="version" type="xs:unsignedInt" use="optional"/>
      <xs:attribute name="maxExpiresDelta" type="xs:unsignedInt" use="optional"/>
      <xs:attribute name="maxTransportSize" type="xs:unsignedInt" use="optional"/>
  </xs:complexType>

<xs:complexType name="fecParamType">
    <xs:simpleContent>
      <xs:extension base="xs:string">
      </xs:extension>
    </xs:simpleContent>
  </xs:complexType>
</xs:schema>
```

FIG. 30 C

| Element or Attribute | Cardinality | Data Type | Description |
|---|---|---|---|
| SystemTime | 1 | | |
| @currentUtcOffset | 1 | xs:unsignedByte | The current offset in whole seconds between TAI and UTC. |
| @ptpPrepend | 0..1 | xs:unsignedShort | Signals the upper 16 bits of the 48-bit count of PTP seconds. |
| @leap59 | 0..1 | xs:boolean | Indicates a pending 59-second leap second event |
| @leap61 | 0..1 | xs:boolean | Indicates a pending 61-second leap second event |
| @utcLocalOffset | 1 | xs:duration | Indicates the offset between the local time zone of the originating broadcast station, and UTC. |
| @dsStatus | 0..1 | xs:boolean | Indicates that Daylight Saving Time is in effect |
| @dsDayOfMonth | 0..1 | xs:unsignedByte (range 1..31) | Indicates the local day of the month on which the transition into or out of daylight saving time is to occur. |
| @dsHour | 0..1 | xs:unsignedByte (range 0..24) | Indicates the local hour at which the transition into or out of daylight saving time is to occur (0–24). |

FIG. 31

```xml
<?xml version="1.0" encoding="UTF-8"?>
  <xs:schema xmlns:xs="http://www.w3.org/2001/XMLSchema"
    xmlns:systime="http://www.atsc.org/XMLSchemas/ATSC3/Delivery/SYSTIME/1.0/"
    targetNamespace="http://www.atsc.org/XMLSchemas/ATSC3/Delivery/SYSTIME/1.0/"
    elementFormDefault="qualified"
    attributeFormDefault="qualified">
    <xs:import namespace="http://www.w3.org/XML/1998/namespace"
      schemaLocation="http://www.w3.org/2001/xml.xsd"/>

<xs:element name="SystemTime" type="systime:SystemTimeType"/>
  <xs:complexType name="SystemTimeType">
    <xs:attribute name="currentUtcOffset" type="xs:unsignedByte" use="required"/>
    <xs:attribute name="ptpPrepend" type="xs:unsignedShort" use="optional"/>
    <xs:attribute name="leap59" type="xs:boolean" use="optional" default="false"/>
    <xs:attribute name="leap61" type="xs:boolean" use="optional" default="false"/>
    <xs:attribute name="utcLocalOffset" type="xs:duration" use="required"/>
    <xs:attribute name="dsStatus" type="xs:boolean" use="optional" default="false"/>
    <xs:attribute name="dsDayOfMonth" type="systime:dsDayType" use="optional" default="1"/>
    <xs:attribute name="dsHour" type="systime:dsHourType" use="optional" default="0"/>
  </xs:complexType>
  <xs:simpleType name="dsDayType">
    <xs:restriction base="xs:unsignedByte">
      <xs:minInclusive value="1"/>
      <xs:maxInclusive value="31"/>
    </xs:restriction>
  </xs:simpleType>
  <xs:simpleType name="dsHourType">
    <xs:restriction base="xs:unsignedByte">
      <xs:minInclusive value="0"/>
      <xs:maxInclusive value="24"/>
    </xs:restriction>
  </xs:simpleType>
</xs:schema>
```

FIG. 32

| Element or Attribute Name | Use | Data Type | Description |
|---|---|---|---|
| bundleDescription | | | Root element of the User Service Bundle Description. |
|   userServiceDescription | | | A single instance of an ATSC 3.0 Service. |
|     @globalServiceID | 1 | anyURI | A globally unique URI that identifies the ATSC 3.0 Service. |
|     @serviceId | 1 | unsignedShort | Reference to corresponding service entry in LLS(SLT). |
|     Name | 0..N | string | Name of the ATSC 3.0 service. |
|       @lang | 1 | xml:lang | Language of the ATSC 3.0 service name. |
|     serviceLanguage | 0..N | string | Available languages of the ATSC 3.0 service. |
|     contentAdvisoryRatings | 0..N | | Specifies the content advisory rating, as defined in the ATSC 3.0 Service Announcement specification [4]. |
|     Channel | 1 | | Contains information about the service |
|       @serviceGenre | 0..1 | unsignedByte | Attribute indicates primary genre of the service. |
|       @serviceIcon | 1 | anyURI | Attribute indicates the Uniform Resource Locator (URL) for the icon used to represent this service. |
|       ServiceDescription | 0..N | | Contains service description possibly in multiple languages. |
|         @serviceDescrText | 1 | string | Attribute indicates description of the service. |
|         @serviceDescrLang | 0..1 | string | Attribute indicates the language of the serviceDescrText. |
|     mpuComponent | 0..1 | | A description about the contents components of ATSC 3.0 Service delivered as MPUs |
|       @mmtPackageId | 1 | string | Reference to a MMT Package for content components of the ATSC 3.0 Service delivered as MPUs. |
|       @nextMmtPackageId | 0..1 | string | Reference to a MMT Package to be used after the one referenced by @mmtPackageId in time for content components of the ATSC 3.0 Service delivered as MPUs. |
|     routeComponent | 0..1 | | A description about the contents components of ATSC 3.0 Service delivered by ROUTE. |
|       @sTSIDUri | 1 | anyURI | Reference to the S-TSID fragment which provides access related parameters to the Transport sessions carrying contents of this ATSC 3.0 Service. |
|       @apdURI | 0..1 | anyURI | Reference to the APD fragment which contains file repair related information. |
|       @sTSIDDestinationIpAddress | 0..1 | string (IP Address) | A string containing the dotted-IPv4 destination address of the packets carrying S-TSID for this service. |
|       @sTSIDDestinationUdpPort | 1 | unsignedShort (port) | Port number of the packets carrying S-TSID for this service. |

FIG.33A

| | | | |
|---|---|---|---|
| @sTSIDSourceIpAddress | 1 | string (IP address) | A string containing the dotted-IPv4 source address of the packets carrying S-TSID for this service. |
| @sTSIDMajorProtocolVersion | 0..1 | unsignedByte | Major version number of the protocol used to deliver the S-TSID for this service. |
| @sTSIDMinorProtocolVersion | 0..1 | unsignedByte | Minor version number of the protocol used to deliver the S-TSID for this service. |
| broadbandComponent | 0..1 | | A description about the contents components of ATSC 3.0 Service delivered by broadband. |
| @fullMPDUri | 1 | anyURI | Reference to an MPD fragment which contains descriptions for contents components of the ATSC 3.0 Service delivered over broadband. |
| ComponentInfo | 1..N | | Contains information about components available in the service. For each component includes information about component type, component role, component name, component identifier, component protection flag. |
| @componentType | 1 | unsignedByte | Attribute indicates the type of this component. |
| @componentRole | 1 | unsignedByte | Attribute indicates the role or kind of this component. |
| @componentProtectedFlag | 0..1 | boolean | Attribute indicates if this component is protected. |
| @componentId | 1 | string | Attribute indicates the identifier of this component. |
| @componentName | 0..1 | string | Attribute indicates the human readable name of this component. |

FIG. 33B

| Element or Attribute Name | Use | Data Type | Description |
|---|---|---|---|
| bundleDescription | | | Root element of the User Service Bundle Description. |
| userServiceDescription | | | A single instance of an ATSC 3.0 Service. |
| @globalServiceID | 1 | anyURI | A globally unique URI that identifies the ATSC 3.0 Service. |
| @serviceId | 1 | unsignedShort | Reference to corresponding service entry in LLS(SLT). |
| Name | 0..N | string | Name of the ATSC 3.0 service. |
| @lang | 1 | xml:lang | Language of the ATSC 3.0 service name. |
| serviceLanguage | 0..N | string | Available languages of the ATSC 3.0 service. |
| contentAdvisoryRatings | 0..N | | Specifies the content advisory rating, as defined in the ATSC 3.0 Service Announcement specification [4]. |
| Channel | 1 | | Contains information about the service |
| @serviceGenre | 0..1 | unsignedByte | Attribute indicates primary genre of the service. |
| @serviceIcon | 1 | anyURI | Attribute indicates the Uniform Resource Locator (URL) for the icon used to represent this service. |
| ServiceDescription | 0..N | | Contains service description possibly in multiple languages. |
| @serviceDescrText | 1 | string | Attribute indicates description of the service. |
| @serviceDescrLang | 0..1 | string | Attribute indicates the language of the serviceDescrText. |
| mpuComponent | 0..1 | | A description about the contents components of ATSC 3.0 Service delivered as MPUs |
| @mmtPackageId | 1 | string | Reference to a MMT Package for content components of the ATSC 3.0 Service delivered as MPUs. |
| @nextMmtPackageId | 0..1 | string | Reference to a MMT Package to be used after the one referenced by @mmtPackageId in time for content components of the ATSC 3.0 Service delivered as MPUs. |
| routeComponent | 0..1 | | A description about the contents components of ATSC 3.0 Service delivered by ROUTE. |
| @sTSIDUri | 1 | anyURI | Reference to the S-TSID fragment which provides access related parameters to the Transport sessions carrying contents of this ATSC 3.0 Service. |
| @sTSIDDestinationIpAddress | 0..1 | string (IP Address) | A string containing the dotted-IPv4 destination address of the packets carrying S-TSID for this service. |
| @sTSIDDestinationUdpPort | 1 | unsignedShort (port) | Port number of the packets carrying S-TSID for this service. |
| @sTSIDSourceIpAddress | 1 | string (IP address) | A string containing the dotted-IPv4 source address of the packets carrying S-TSID for this service. |

FIG.34A

| | | | |
|---|---|---|---|
| @sTSIDMajorProtocolVersion | 0..1 | unsignedByte | Major version number of the protocol used to deliver the S-TSID for this service. |
| @sTSIDMinorProtocolVersion | 0..1 | unsignedByte | Minor version number of the protocol used to deliver the S-TSID for this service. |
| apd | 0..N | | List of associated delivery procedure URIs. |
| @apduri | 0..1 | anyURI | Reference to the APD fragment which contains file repair related information. |
| broadbandComponent | 0..1 | | A description about the contents components of ATSC 3.0 Service delivered by broadband. |
| @fullMPDUri | 1 | anyURI | Reference to an MPD fragment which contains descriptions for contents components of the ATSC 3.0 Service delivered over broadband. |
| ComponentInfo | 1..N | | Contains information about components available in the service. For each component includes information about component type, component role, component name, component identifier, component protection flag. |
| @componentType | 1 | unsignedByte | Attribute indicates the type of this component. |
| @componentRole | 1 | unsignedByte | Attribute indicates the role or kind of this component. |
| @componentProtectedFlag | 0..1 | boolean | Attribute indicates if this component is protected. |
| @componentId | 1 | string | Attribute indicates the identifier of this component. |
| @componentName | 0..1 | string | Attribute indicates the human readable name of this component. |

FIG. 34 B

| Element or Attribute Name | Use | Data Type | Description |
|---|---|---|---|
| associatedProcedureDescription | | | Root element of the Associated Procedure Description. |
| postFileRepair | 1 | | Container for the temporal parameters pertaining to the file repair procedure. |
| @offsetTime | 0..1 | unsignedLong | A first wait interval for the receiver related to the file repair procedure. |
| @randomTimePeriod | 1 | unsignedLong | A second wait interval for the receiver related to the file repair procedure. |

FIG. 35

METHOD FOR SIGNALING, METHOD FOR RECEIVING, SIGNALING DEVICE, AND RECEIVING DEVICE

CROSS REFERENCE TO RELATED APPLICATIONS

The present application is a continuation application of U.S. patent application Ser. No. 16/997,257, filed on Aug. 19, 2020, which is a continuation application of U.S. patent application Ser. No. 15/769,861, filed on Apr. 20, 2018, which is the National Stage of International Application No. PCT/JP2016/004660, filed Oct. 21, 2016, which claims priority under 35 U.S.C. § 119 on U.S. Provisional Patent Application No. 62/245,525, filed on Oct. 23, 2015, U.S. Provisional Patent Application No. 62/255,446, filed on Nov. 14, 2015, and U.S. Provisional Patent Application No, 02/331,376 filed on May 3, 2016, the entire contents of which are hereby incorporated by reference.

TECHNICAL FIELD

The present disclosure relates generally to a service signaling.

BACKGROUND ART

A broadcast service is capable of being received by users having broadcast receivers. Broadcast services can be roughly divided into two categories, namely, a radio broadcast service carrying only audio and a multimedia broadcast service carrying audio, video and data. Such broadcast services have developed from analog services to digital services. More recently, various types of broadcasting systems (such as a cable broadcasting system, a satellite broadcasting system, an Internet based broadcasting system, and a hybrid broadcasting system using both a cable network, Internet, and/or a satellite) provide high quality audio and video broadcast, services along with a high-speed data service. Also, broadcast services include sending and/or receiving audio, video, and/or data directed to an individual computer and/or group of computers and/or one or more mobile communication devices.

In addition to more traditional stationary receiving devices, mobile communication devices are likewise configured to support such services. Such configured mobile devices have facilitated users to use such services while on the move, such as mobile phones.

SUMMARY OF INVENTION

Technical Problem

An increasing need for multimedia services has resulted in various wireless and/or broadcast services for both mobile communications and general wire communications. Further, this convergence has merged the environment for different wire and wireless broadcast services.

Open Mobile Alliance (OMA), is a standard for interworking between individual mobile solutions, serves to define various application standards for mobile software and Internet services. OMA Mobile Broadcast Services Enabler Suite (BCAST) is a specification designed to support mobile broadcast technologies. The OMA BCAST defines technologies that, provide IP based mobile content delivery which includes a variety of functions such as a service guide, downloading and streaming, service and content protection, service subscription, and roaming.

The foregoing and other objectives, features, and advantages of the invention will be more readily understood upon consideration of the following detailed description of the invention, taken in conjunction with the accompanying drawings.

BRIEF DESCRIPTION OF DRAWINGS

FIG. 4 illustrates description scheme.

FIG. 5 illustrates a ServiceMediaExtension with MajorChannelNum and MinorChannelNum.

FIG. 6 illustrates a ServiceMediaExtension with an Icon.

FIG. 7 illustrates a ServiceMediaExtension with a url.

FIG. 8 illustrates a ServiceMedicalExtension with MajorChannelNum, MinorChannelNum, Icon, and url.

FIG. 9A illustrates AudioLanguage elements and TextLanguage elements.

FIG. 9B illustrates AudioLanguage elements and TextLanguage elements.

FIG. 9C illustrates AudioLanguage elements and TextLanguage elements.

FIG. 10A illustrates AudioLanguage elements and TextLanguage elements.

FIG. 10B illustrates AudioLanguage elements and TextLanguage elements.

FIG. 10C illustrates AudioLanguage elements and TextLanguage elements.

FIG. 11 illustrates component information description signaling.

FIG. 13A illustrates a binary syntax for a component information descriptor.

FIG. 13B illustrates a binary syntax for a component information descriptor.

FIG. 14A illustrates a binary syntax for a channel information descriptor.

FIG. 14B illustrates a binary syntax for a channel information descriptor.

FIG. 15 illustrates an eXtensible Markup Language (XML) syntax and semantics for a component information descriptor.

FIG. 16 illustrates a XML syntax and semantics for a channel information descriptor.

FIG. 17 illustrates a XML schema for a component information descriptor.

FIG. 18 illustrates a XML schema for a channel information descriptor.

FIG. 19A illustrates a User Service Bundle Description (USBD) Fragment for MPEG media transport (MMT).

FIG. 19B illustrates a User Service Bundle Description (USBD) Fragment for MPEG media transport (MMT).

FIG. 19C illustrates a User Service Bundle Description (USBD) Fragment for MPEG media transport (MMT).

FIG. 20A illustrates a XML schema for MMT USBD.

FIG. 20B illustrates a XML schema for MMT USBD.

FIG. 20C illustrates a XML schema for MMT USBD.

FIG. 22A illustrates a XML schema for MMT USBD.

FIG. 22B illustrates a XML schema for MMT USBD.

FIG. 22C illustrates a XML schema for MMT USBD.

FIG. 23A illustrates a USBD fragment for Real-time Object delivery over Unidirectional Transport (ROUTE).

FIG. 23B illustrates a USBD fragment for Real-time Object delivery over Unidirectional Transport (ROUTE).

FIG. 24 illustrated a XML schema for ROUTE USBD.

FIG. 25 illustrates Service-based Transport Session Instance Description Fragment.

FIG. 26 illustrates a SrcFlow element.

FIG. 27 illustrates a Extended File Delivery Table.

FIG. 28 illustrates a RepairFlow element.

FIG. 29 illustrates a protected object bundle.

FIG. 30A illustrates a XML schema.

FIG. 30B illustrates a XML schema.

FIG. 30C illustrates a XML schema.

FIG. 31 illustrates a SystemTime element structure.

FIG. 32 illustrates a XML schema for SystemTime.

FIG. 33A illustrates a User Service Bundle Description Fragment for MMT.

FIG. 33B illustrates a User Service Bundle Description Fragment for MMT.

FIG. 34A illustrates a User Service Bundle Description Fragment for MMT.

FIG. 34B illustrates a User Service Bundle Description Fragment for MMT.

FIG. 35 illustrates an Associated Procedure Description Fragment.

DESCRIPTION OF EMBODIMENTS

Figure 1:
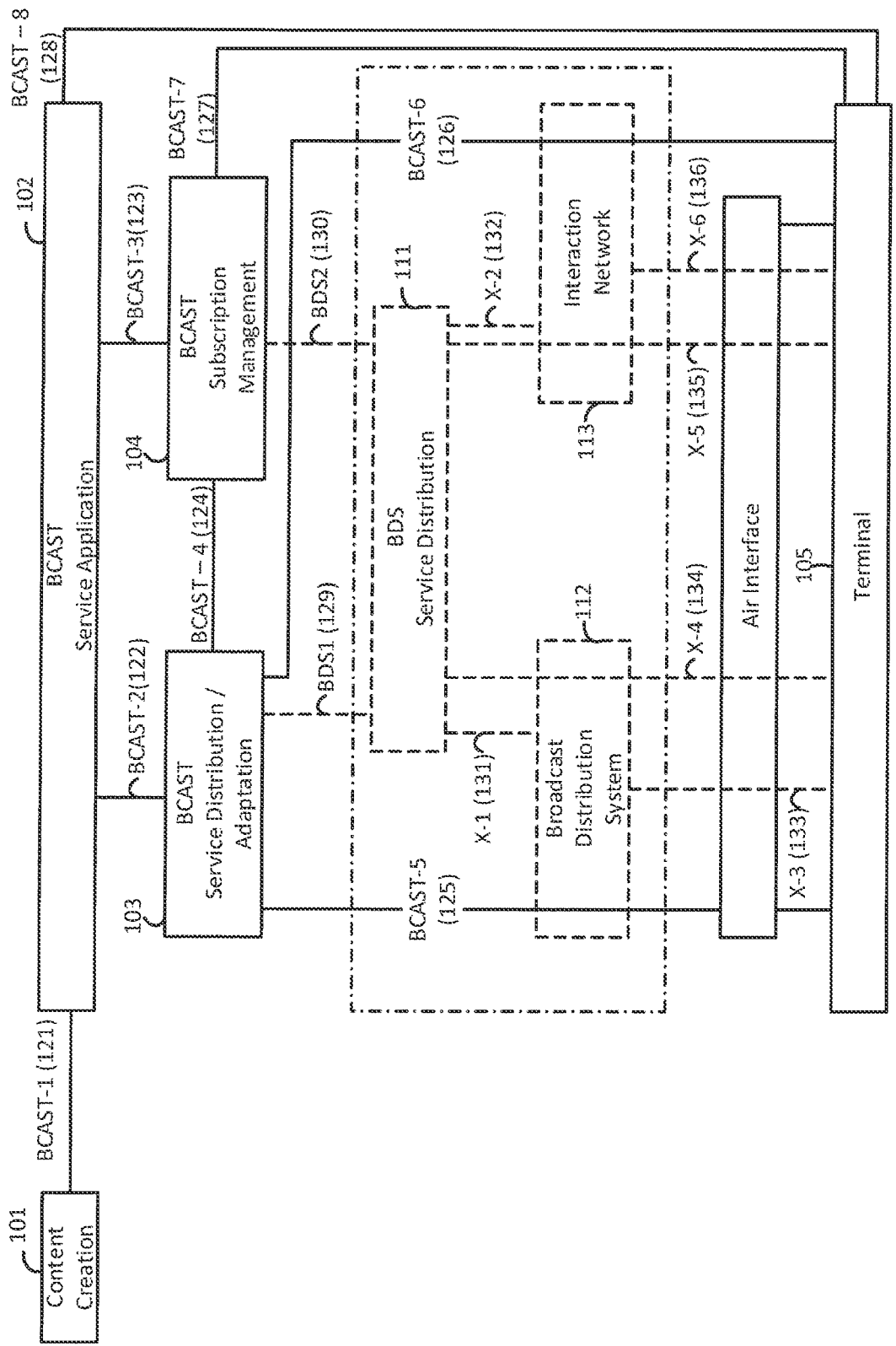
FIG. 1 is a block diagram illustrating logical architecture of a BCAST system specified by OMA BCAST working group in an application layer and a transport layer.

Referring to FIG. 1, a logical architecture of a broadcast system specified by OMA (Open Mobile Alliance) Broadcast (BCAST) may include an application layer and a transport layer. The logical architecture of the BCAST system may include a Content Creation (CC) 101, a BCAST Service Application 102, a BCAST Service Distribution Adaptation (BSDA) 103, a BCAST Subscription Management (BSM) 104, a Terminal 105, a Broadcast Distribution System (BDS) Service Distribution 111, a BDS 112, and an Interaction Network 113. It is to be understood that the broadcast system and/or receiver system may be reconfigured, as desired. It is to be understood that the broadcast system and/or receiver system may include additional elements and/or fewer elements, as desired, In general, the Content Creation (CC) 101 may provide content that, is the basis of BCAST services. The content may include files for common broadcast services, e.g., data for a movie including audio and video. The Content Creation 101 provides a BCAST Service Application 102 with attributes for the content, which are used to create a service guide and to determine a transmission bearer over which the services will be delivered.

In general, the BCAST Service Application 102 may receive data for BCAST services provided from the Content Creation 101, and converts the received data into a form suitable for providing media encoding, content protection, interactive services, etc. The BCAST Service Application 102 provides the attributes for the content, which is received from the Content Creation 101, to the BSDA 103 and the BSM 104.

In general, the BSDA 103 may perform operations, such as file and/or streaming delivery service gathering, service protection, service guide creation and/or delivery and service notification, using the BCAST service data provided from the BCAST Service Application 102. The BSDA 103 adapts the services to the BDS 112.

In general, the BSM 104 may manage, via hardware or software, service provisioning, such as subscription and charging-related functions for BCAST service users, information provisioning used for BCAST services, and mobile terminals that receive the BCAST services.

In general, the Terminal 105 may receive content, and/or service guide and program support information, such as content protection, and provides a broadcast service to a user. The BDS Service Distribution 111 delivers mobile broadcast services to a plurality of terminals through mutual communication with the BUS 112 and the Interaction Network 113.

In general, the EDS 112 may deliver mobile broadcast services over a broadcast channel, and may include, for example, a Multimedia Broadcast Multicast Service (MBMS) by 3rd Generation Project Partnership (3GPP), a Broadcast Multicast Service (BCMCS) by 3rd Generation Project Partnership 2 (3GPP2), a DVB-Handheld (DVB-H) by Digital Video Broadcasting (DVB), or an Internet Protocol (IP) based broadcasting communication network, The Interaction Network 113 provides an interaction channel, and may include, for example, a cellular network. 3GPP MBMS is described in technical standard (TS) "3GPP). TS 26.346 V12.4.0 (2014-12)", "3rd Generation Partnership Project; Technical Specification Group Services and System Aspects; Multimedia Broadcast Multicast Service (MBMS); Protocols and codecs (Release 12)", which is incorporated by reference in their entirety.

The reference points, or connection paths between the logical entities of FIG. 1, may have a plurality of interfaces, as desired. The interfaces are used for communication between two or more logical entities for their specific purposes. A message format, a protocol and the like are applied for the interfaces. In some examples, there are no logical interfaces between one or more different functions.

BCAST-1 121 is a transmission path for content and content attributes, and BCAST-2 122 is a transmission path for a content-protected or content-unprotected BCAST service, attributes of the BCAST service, and content attributes.

BCAST-3 123 is a transmission path for attributes of a BCAST service, attributes of content, user preference and/or subscription information, a user request, and a response to the request. BCAST-4 124 is a transmission path for a notification message, attributes used for a service guide, and a key used for content, protection and service protection.

BCAST 5 125 is a transmission path for a protected BCAST service, an unprotected BCAST service, a content-protected BCAST service, a content-unprotected BCAST service, BCAST service attributes, content attributes, a notification, a service guide, security materials such as a Digital Right Management (DRM) Right Object (RO) and key values used for BCAST service protection, and data and signaling transmitted through a broadcast channel.

BCAST-6 126 is a transmission path for a protected BCAST service, an unprotected BCAST service, a content-protected BCAST service, a content-unprotected BCAST service, BCAST service attributes, content attributes, a notification, a service guide, security materials such as a DRM RO and key values used for BCAST service protection, and data and signaling transmitted through an interaction channel BCAST-7 127 is a transmission path for service provisioning, subscription information, device management, and user preference information transmitted through an interaction channel for control information related to receipt of security materials, such as a DRM RO and key values used for BCAST service protection.

BCAST-8 128 is a transmission path through which user data for a BCAST service is provided. BDS-1 129 is a transmission path for a protected BCAST service, an unprotected BCAST service, BCAST service attributes, content attributes, a notification, a service guide, and security materials, such as a DRM RO and key values used for BCAST service protection.

BDS-2 130 is a transmission path for service provisioning, subscription information, device management, and security materials, such as a DRM RO and key values used for BCAST service protection.

X-1 131 is a reference point between the BDS Service Distribution 111 and the BDS 112. X-2 132 is a reference point between the BUS Service Distribution 111 and the Interaction Network 113 X-3 133 is a reference point between the BDS 112 and the Terminal 105. X-4 134 is a reference point between the BDS Service Distribution 111 and the Terminal 105 over a broadcast channel. X-5 135 is a reference point between the BDS Service Distribution 111 and the Terminal 105 over an interaction channel. X6 136 is a reference point between the Interaction Network 113 and the Terminal 105.

Figure 2:
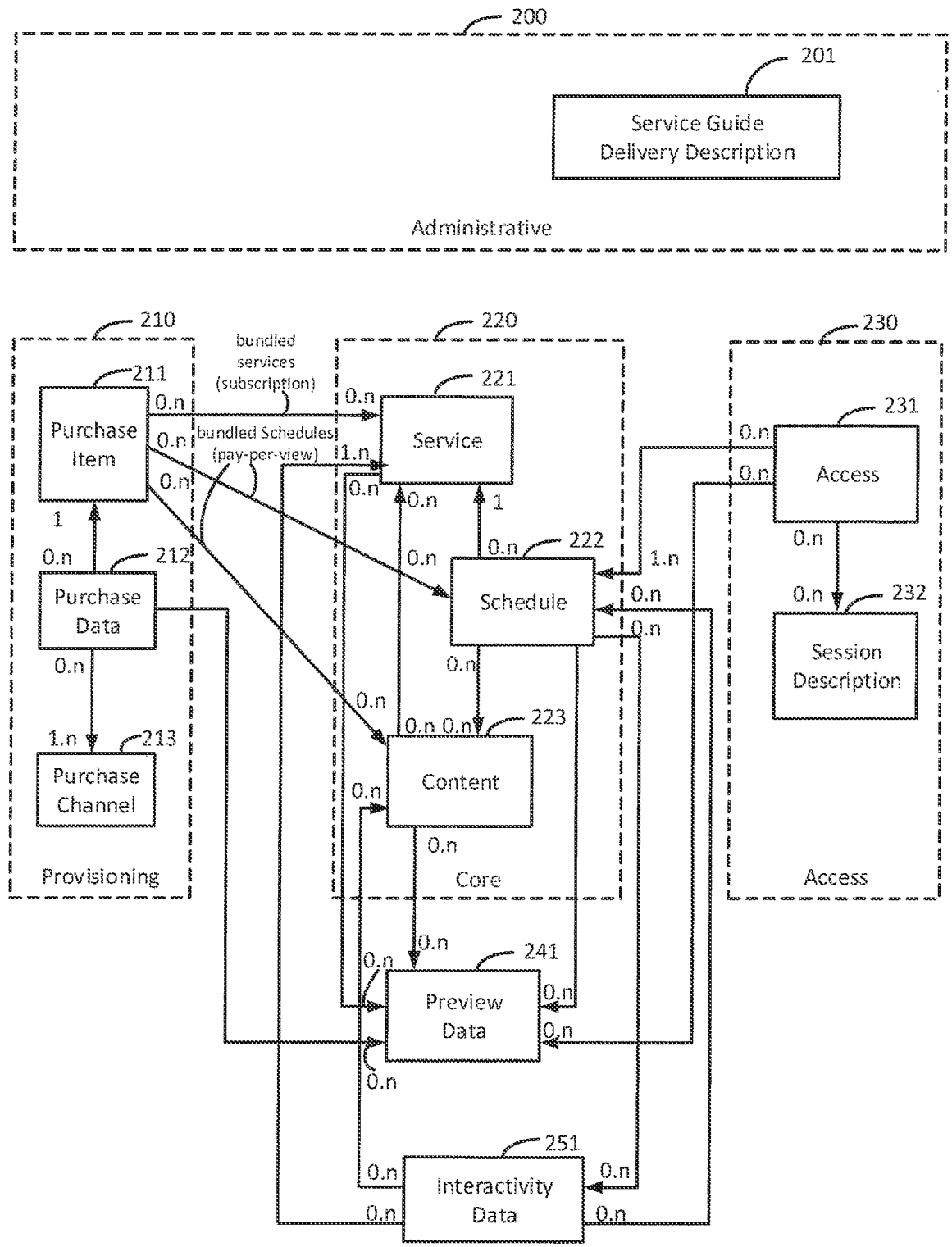
FIG. 2 is a diagram illustrating a structure of a service guide for use in the OMA BCAST system.

Referring to FIG. 2, an exemplary service guide for the OMA BCAST system is illustrated. For purposes of illustration, the solid arrows between fragments indicate the reference directions between the fragments. It is to be understood that the service guide system may be reconfigured, as desired. It is to be understood that the service guide system may include additional elements and/or fewer elements, as desired. It is to be understood that functionality of the elements may be modified and/or combined, as desired.

Figure 2A:
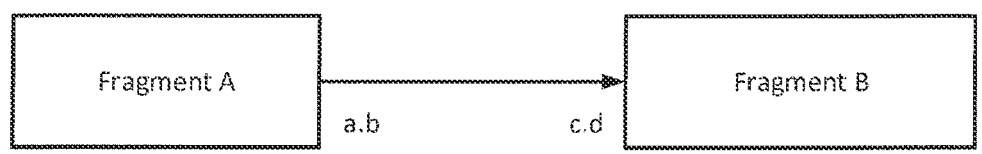
FIG. 2A is a diagram showing cardinalities and reference direction between service guide fragments.

FIG. 2A is a diagram showing cardinalities and reference direction between service guide fragments. The meaning of the cardinalities shown in the FIG. 2 is the following: One instantiation of Fragment A as in FIG. 2A references c to d instantiations of Fragment B. If c=d, d is omitted. Thus, if c >0 and Fragment A exists, at least c instantiation of Fragment B must also exist, but at most d instantiations of Fragment B may exist. Vice versa, one instantiation of Fragment B is referenced by a to b instantiations of Fragment A. If a=b, b is omitted. The arrow connection from Fragment A pointing to Fragment 13 indicates that Fragment A contains the reference to Fragment B.

With respect to FIG. 2, in general, the service guide may include an Administrative Group 200 for providing basic information about the entire service guide, a Provisioning Group 210 for providing subscription and purchase information, a Core Group 220 that acts as a core part of the service guide, and an Access Group 230 for providing access information that control access to services and content.

The Administrative Group 200 may include a Service Guide Delivery Descriptor (SGDD) block 201. The Provision Group 210 may include a Purchase Item block 211, a Purchase Data block 212, and a Purchase Channel block 213. The Core Group 220 may include a Service block 221, a Schedule block 222, and a Content block 223. The Access Group 230 may include an Access block 231 and a Session Description block 232.

The service guide may further include Preview Data 241 and Interactivity Data 251 in addition to the four information groups Administrative Group 200, Provision Group 210, Core Group 220, and Access Group 230.

The aforementioned components may be referred to as basic units or fragments constituting aspects of the service guide, for purposes of identification.

The SG-DD fragment 201 may provide information about a delivery session where a Service Guide Delivery Unit (SGDU) is located. The SGDU is a container that contains service guide fragments 211, 212, 213, 221, 222, 223, 231, 232, 241, and 251, which constitute the service guide. The SGDD may also provide the information on the entry points for receiving the grouping information and notification messages.

The Service fragment 221, which is an upper aggregate of the content included in the broadcast service, may include information on service content, genre, service location, etc. In general, the 'Service' fragment describes at an aggregate level the content items, which comprise a broadcast service. The service may be delivered to the user using multiple means of access, for example, the broadcast channel and the interactive channel. The service may be targeted at a certain user group or geographical area. Depending on the type of the service it may have interactive part(s), broadcast-only part(s), or both. Further, the service may include components not directly related to the content but to the functionality of the service such as purchasing or subscription information. As the part of the Service Guide, the 'Service' fragment forms a central hub referenced by the other fragments including 'Access', 'Schedule', 'Content' and 'PurchaseItem' fragments. In addition to that, the 'Service' fragment may reference 'PreviewData' fragment. It may be referenced by none or several of each of these fragments, Together with the associated fragments the terminal may determine the details associated with the service at any point of time. These details may be summarized into a user-friendly display, for example, of what, how and when the associated content may be consumed and at what cost.

The Access fragment 231 may provide access-related information for allowing the user to view the service and delivery method, and session information associated with the corresponding access session. As such, the 'Access' fragment describes how the service may be accessed during the lifespan of the service. This fragment contains or references Session Description information and indicates the delivery method. One or more 'Access' fragments may reference a 'Service' fragment, offering alternative ways for accessing or interacting with the associated service. For the Terminal, the 'Access' fragment provides information on what capabilities are required from the terminal to receive and render the service, The 'Access' fragment provides Session Description parameters either in the form of inline text, or through a pointer in the form of a Uniform Resource Identifier (URI) to a separate Session Description. Session Description information may be delivered over either the broadcast channel or the interaction channel.

The Session Description fragment 232 may be included in the Access fragment 231, and may provide location information in a URI form so that the terminal may detect information on the Session Description fragment 232. The Session Description fragment 232 may provide address information, codec information, etc., about multimedia content existing in the session. As such, the 'Session Description' is a Service Guide fragment, which provides the session information for access to a service or content item. Further, the Session Description may provide auxiliary description information, used for associated delivery procedures. The Session Description information is provided using either syntax of Session Description Protocol (SDP) in text format, or through a 3rd Generation Partnership Project (3GPP) Multimedia Broadcast Multicast Service (MBMS) User Service Bundle Description. Auxiliary description information is provided in XML format and contains an Associated Delivery Description as specified in [BCAST10-Distribution]. Note that in case SDP syntax is used, an alternative way to deliver the Session Description is by encapsulating the SDP in text format in 'Access' fragment. Note that Session Description may be used both for Service Guide delivery itself as well as for the content sessions.

The Purchase Item fragment 211 may provide a bundle of service, content, time, etc., to help the user subscribe to or purchase the Purchase Item fragment 211. As such, the 'PurchaseItem' fragment represents a group of one or more services (i.e. a service bundle) or one or more content items, offered to the end user for free, for subscription and/or purchase. This fragment can be referenced by 'PurchaseData' fragment(s) offering more information on different service bundles. The 'PurchaseItem' fragment may be also associated with: (1) a 'Service' fragment to enable bundled services subscription and/or, (2) a 'Schedule' fragment to enable consuming a certain service or content in a certain timeframe (pay-per-view functionality) and/or, (3) a 'Content' fragment to enable purchasing a single content file related to a service, (4) other 'PurchaseItem' fragments to enable bundling of purchase items.

The Purchase Data fragment 212 may include detailed purchase and subscription information, such as price information and promotion information, for the service or content bundle. The Purchase Channel fragment 213 may provide access information for subscription or purchase. As such, the main function of the 'PurchaseData' fragment is to express the available pricing information about the associated purchase item. The 'PurchaseData' fragment collects the information about one or several purchase channels and may be associated with PreviewData specific to a certain service or service bundle. It carries information about pricing of a service, a service bundle, or, a content item. Also, information about promotional activities may be included in this fragment. The SGDD may also provide information regarding entry points for receiving the service guide and grouping information about the SGDU as the container.

The Preview Data fragment 241 may be used to provide preview information for a service, schedule, and content. As such, 'PreviewData' fragment contains information that is used by the terminal to present the service or content outline to users, so that the users can have a general idea of what the service or content is about. 'PreviewData' fragment can include simple texts, static images (for example, logo), short video clips, or even reference to another service which could be a low bit rate version for the main service. 'Service', 'Content', 'PurchaseData', 'Access' and 'Schedule' fragments may reference 'PreviewData' fragment.

The Interactivity Data fragment 251 may be used to provide an interactive service according to the service, schedule, and content during broadcasting. More detailed information about the service guide can be defined by one or more elements and attributes of the system. As such, the InteractivityData contains information that is used by the terminal to offer interactive services to the user, which is associated with the broadcast content. These interactive services enable users to e.g. vote during TV shows or to obtain content related to the broadcast content. 'InteractivityData' fragment points to one or many 'InteractivityMedia' documents that include xhtml files, static images, email template, Short Message Service (SMS) template, Multimedia Messaging Service (MMS) documents, etc. The 'InteractivityData' fragment may reference the 'Service', 'Content' and 'Schedule' fragments, and may be referenced by the 'Schedule' fragment.

The 'Schedule' fragment defines the timeframes in which associated content items are available for streaming downloading and/or rendering. This fragment references the 'Service' fragment. If it also references one or more 'Content' fragments or 'InterativityData' fragments, then it defines the valid distribution and/or presentation timeframe of those content items belonging to the service, or the valid distribution timeframe and the automatic activation time of the InteractivityMediaDocuments associated with the service. On the other hand, if the 'Schedule' fragment does not reference any 'Content' fragment(s) or 'InteractivityData' fragment(s), then it defines the timeframe of the service availability which is unbounded.

The 'Content' fragment gives a detailed description of a specific content item. In addition to defining a type, description and language of the content, it may provide information about the targeted user group or geographical area, as well as genre and parental rating. The 'Content' fragment may be referenced by Schedule, PurchaseItem or 'InteractivityData' fragment. It may reference 'PreviewData' fragment or 'Service' fragment.

The 'PurchaseChannel' fragment carries the information about the entity from which purchase of access and/or content rights for a certain service, service bundle or content item may be obtained, as defined in the 'PurchaseData' fragment. The purchase channel is associated with one or more Broadcast Subscription Managements (3BSMs). The terminal is only permitted to access a particular purchase channel if it is affiliated with a BSM that is also associated with that purchase channel. Multiple purchase channels may be associated to one 'PurchaseData' fragment. A certain end-user can have a "preferred" purchase channel (e.g. a mobile operator) to which purchase requests should be directed. The preferred purchase channel may even be the only channel that an end-user is allowed to use.

The ServiceGuideDeliveryDescriptor is transported on the Service Guide Announcement Channel, and informs the terminal the availability, metadata and grouping of the fragments of the Service Guide in the Service Guide discovery process. A SGDD allows quick identification of the Service Guide fragments that are either cached in the terminal or being transmitted. For that reason, the SGDD is preferably repeated if distributed over broadcast channel The SGDD also provides the grouping of related Service Guide fragments and thus a means to determine completeness of such group. The ServiceGuideDeliveryDescriptor is especially useful if the terminal moves from one service coverage area to another. In this case, the ServiceGuideDeliveryDescriptor can be used to quickly check which of the Service Guide fragments that have been received in the previous service coverage area are still valid in the current service coverage area, and therefore don't have to be re-parsed and re-processed.

Although not expressly depicted, the fragments that constitute the service guide may include element and attribute values for fulfilling their purposes. In addition, one or more of the fragments of the service guide may be omitted, as desired. Also, one or more fragments of the service guide may be combined, as desired. Also, different aspects of one or more fragments of the service guide may be combined together, reorganized, and otherwise modified, or constrained as desired.

Figure 3:
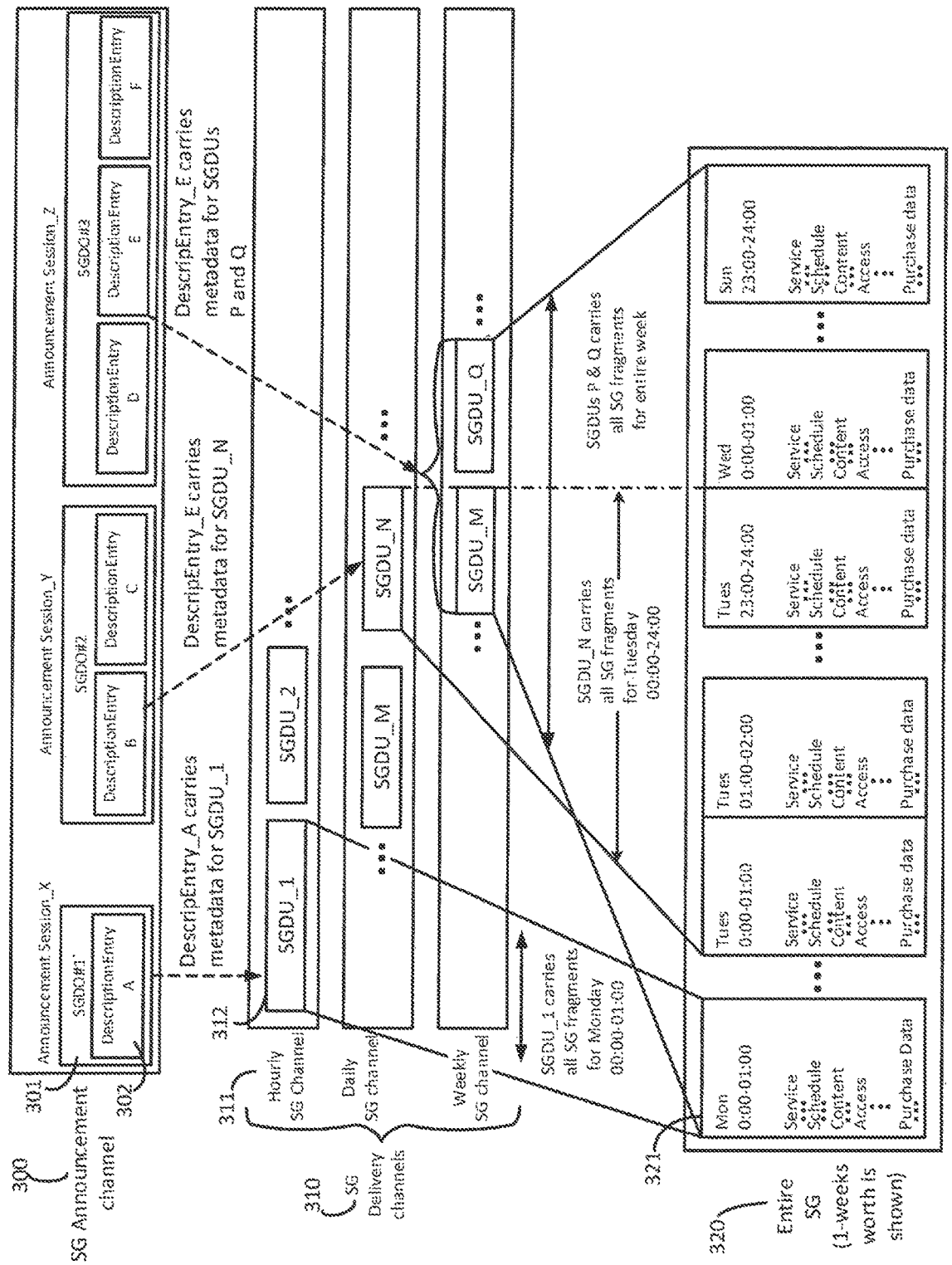
FIG. 3 is a block diagram illustrating a principle of the conventional service guide delivery method.

Referring to FIG. 3, an exemplary block diagram illustrates aspects of a service guide delivery technique. The Service Guide Deliver Descriptor fragment 201 may include the session information, grouping information, and notification message access information related to fragments containing service information. When the mobile broadcast service-enabled terminal 105 turns on or begins to receive the service guide, it may access a Service Guide Announcement Channel (SG Announcement Channel) 300.

The SG Announcement Channel 300 may include at least one of SGDD 200 (e.g., SGDD #1, . . . , SGDD 190 2, SGDD #3), which may be formatted in any suitable format, such as that illustrated in Service Guide for Mobile Broadcast Services, Open Mobile Alliance, Version 1.0.1, Jan. 9, 2013 and/or Service Guide for Mobile Broadcast Services, open Mobile Alliance. Version 1.1, Oct. 29, 3013; both of which are incorporated by reference in their entirety. The descriptions of elements and attributes constituting the Service Guide Delivery Descriptor fragment 201 may be reflected in any suitable format, such as for example, a table format and/or in an eXtensible Markup Language (XML) schema.

The actual data is preferably provided in XML format according to the SGDD fragment 201. The information related to the service guide may be provided in various data formats, such as binary, where the elements and attributes are set to corresponding values, depending on the broadcast system.

The terminal 105 may acquire transport information about a Service Guide Delivery Unit (SGDU) 312 containing fragment information from a DescriptorEntry of the SGDD fragment received on the SG Announcement Channel 300.

The DescriptorEntry 302, which may provide the grouping information of a Service Guide includes the "GroupingCriteria", "ServiceGuideDeliveryUnit", "Transport", and AlternativeAccessURI". The transport-related channel information may be provided by the "Transport" or "AlternativeAccessURI" and the actual value of the corresponding channel is provided by "ServiceGuideDeliveryUnit". Also, upper layer group information about the SGDU 312, such as "Service" and "Genre", may be provided by "GroupingCriteria". The terminal 105 may receive and present the SGDUs 312 to the user according to the corresponding group information.

Once the transport information is acquired, the terminal 105 may access the Delivery Channels acquired from a DescriptorEntry 302 in an SGDD 301 on an Service Guide (SG) Delivery Channel 310 to receive the actual SGDU 312. The SG Delivery Channels can be identified using the "GroupingCriteria". In the case of time grouping, the SGDU can be transported with a time-based transport channel such as an Hourly SG Channel 311 and a Daily SG Channel. Accordingly the terminal 105 can selectively access the channels and receive the SGDUs existing on the corresponding channels. Once the entire SGDU is completely received on the SG Delivery Channels 310, the terminal 105 checks fragments contained in the SGDUs received on the SG Delivery Channels 310 and assembles the fragments to display an actual full service guide 320 on the screen which can be subdivided on an hourly basis 321.

In the conventional mobile broadcast system, the service guide is formatted and transmitted such that only configured terminals receive the broadcast signals of the corresponding broadcast system. For example, the service guide information transmitted by a DVB-H system can only be received by terminals configured to receive the DVB-H broadcast.

The service providers provide bundled and integrated services using various transmission systems as well as various broadcast systems in accordance with service convergence, which may be referred to as multiplay services. The broadcast service providers may also provide broadcast services on IP networks. Integrated service guide transmission and/or reception systems may be described using terms of entities defined in the 3GPP standards and OMA BCAST standards (e.g., a scheme). however, the service guide and/or reception systems may be used with any suitable communication and/or broadcast system.

Referring to FIG. 4, the scheme may include, for example, (1) Name; (2) Type; (3) Category; (4) Cardinality; (5) Description; and (6) Data type. The scheme may be arranged in any manner, such as a table format of air XML format. The "name" column indicates the name of an element or an attribute.

The "type" column indicates an index representing an element or an attribute. An element can be one of E1, E2, E3, E4, E[n]. E1 indicates an upper element of an entire message, 1f2 indicates an element below the E1, E3 indicates an element below E2, E4 indicates an element below the E3, and so forth, An attribute is indicated by A. For example, an "A" below E1 means an attribute of element E1. In some cases the notation may mean the following B=Element, A=Attribute, E1=sub-element, E2=sub-element's sub-element, E[n]=sub-element of element[n−1]. The "category" column is used to indicate whether the element or attribute is mandatory. If an element is mandatory, the category of the element is flagged with an "M". If an element is optional, the category of the element, is flagged with an "O". If the element is optional for network to support it the element is flagged with a "NO". If the element is mandatory for terminal to support it is flagged with a TM. If the element is mandatory for network to support it the element is flagged with "NM", If the element is optional for terminal to support it the element is flagged with "TO". If an element or attribute has cardinality greater than zero, it is classified as M or NM to maintain consistency The "cardinality" column indicates a relationship between elements and is set to a value of 0, 0 . . . 1, 1, 0 . . . n, and 1 . . . n. 0 . . . indicates an option, 1 indicates a necessary relationship, and n indicates multiple values. For example, 0 . . . n means that a corresponding element can have no or n values. The "description" column describes the meaning of the corresponding element or attribute, and the "data type" column indicates the data type of the corresponding element or attribute.

A service may represent a bundle of content items, which forms a logical group to the end-user. An example would be a Television (TV) channel, composed of several TV shows. A 'Service' fragment contains the metadata describing the Mobile Broadcast service. It is possible that the same metadata (i.e., attributes and elements) exist in the 'Content' fragment(s) associated with that 'Service' fragment. In that, situation, for the following elements: 'ParentalRating', "TargetUserProfile', 'Genre' and 'BroadcastArea', the values defined in 'Content' fragment take precedence over those in 'Service' fragment.

The program guide elements of this fragment may be grouped between the Start of program guide and end of program guide cells in a fragment. This localization of the elements of the program guide reduces the computational complexity of the receiving device in arranging a programming guide. The program guide elements are generally used for user interpretation. This enables the content creator to provide user readable information about the service. The terminal should use declared program guide elements in this fragment for presentation to the end-user. The terminal may offer search, sort, etc. functionalities. The Program Guide may consist of the following service elements: (1) Name; (2) Description; (3) AudioLanguage; (4) TextLanguage; (5) ParentalRating; (6) TargetUserProfile: and (7) Genre.

The "Name" element may refer to Name of the Service, possibly in multiple languages. The language may be expressed using built-in XML attribute 'xml:lang'.

The "Description" element may be multiple languages and may be expressed using built-in XML attribute 'xml:lang'.

The "AudioLanguage" element may declare for the end users that this service is available with an audio track corresponding to the language represented by the value of this element, The textual value of this element can be made available for the end users in different languages. In such a case the language used to represent the value of this element may he signaled using the built-in XML attribute 'xml:lang', and may include multi-language support. The AudioLanguage may contain an attribute languageSDPTag.

The "languageSDPTag" attribute is an identifier of the audio language described by the parent 'AudioLanguage' element as used in the media sections describing the audio track in a Session Description. Each 'AudioLanguage' element declaring the same audio stream may have the same value of the 'languageSDPTag'.

The "TextLanguage" element may declare for the end user that the textual components of this service are available in the language represented by the value of this element. The textual components can be, for instance, a caption or a sub-title track. The textual value of this element can be made available for the end users in different languages. In such a case the language used to represent the value of this element may be signaled using the built-in XML attribute 'xml:lang', and may include multi-language support. The same rules and constraints as specified for the element 'AudioLanguage' of assigning and interpreting the attributes 'languageSDPTag' and 'xml:lang' may be applied for this element.

The "languageSDPTag" attribute is an identifier of the text language described by the parent 'TextLanguage' element as used in the media sections describing the textual track in a Session Description.

The "ParentalRating" element may declare criteria parents and might be used to determine whether the associated item is suitable for access by children, defined according to the regulatory requirements of the service area. The terminal may support 'ParentalRating' being a free string, and the terminal may support the structured way to express the parental rating level by using the 'ratingSystem' and 'ratingValueName' attributes.

The "ratingSystem" attribute may specifiy the parental rating system in use, in which context the value of the 'ParentalRating' element is semantically defined. This allows terminals to identify the rating system in use in a non-ambiguous manner and act, appropriately. This attribute may be instantiated when a rating system is used. Absence of this attribute means that no rating system is used (i.e. the value of the 'ParentalRating' element is to be interpreted as a free string).

The "ratingValueName" attribute may specify the human-readable name of the rating value given by this ParentalRating element.

The "TargetUserProfile" may specify elements of the users whom the service is targeting at. The detailed personal attribute names and the corresponding values are specified by attributes of 'attributeName' an 'attributeValue'. Amongst the possible profile attribute names are age, gender, occupation, etc. (subject to national and/or local rules and/or regulations, if present and as applicable regarding use of personal profiling information and personal data privacy). The extensible list of 'attributeName' and 'attributeValue' pairs for a particular service enables end user profile filtering and end user preference filtering of broadcast services. The terminal may be able to support "TargetUserProfile' element. The use of "TargetUserProfile' element may be an "opt-in" capability for users. Terminal settings may allow users to configure whether to input their personal profile or preference and whether to allow broadcast service to be automatically filtered based on the users' personal attributes without users' request. This element may contain the following attributes: attributeName and attributeValue.

The "attributeName" attribute may be a profile attribute name.

The "attributeValue" attribute may be a profile attribute value.

The "Genre" element may specify classification of service associated with characteristic form (e.g. comedy, drama). The OMA BCAST Service Guide may allow describing the format of the Genre element in the Service Guide in two ways. The first way is to use a free string. The second way is to use the "href" attributes of the Genre element to convey the information in the form of a controlled vocabulary (classification scheme as defined in [TVA-Metadata] or classification list as defined in [Moving Image Genre-Form Guide (MIGFG)]). The built-in XML attribute xml:lang may be used with this element to express the language. The network may instantiate several different sets of 'Genre' element, using it as a free string or with a 'href' attribute. The network may ensure the different sets have equivalent and nonconflicting meaning, and the terminal may select one of the sets to interpret for the end-user. The 'Genre' element may contain the following attributes: type and href.

The "type" attribute may signal the level of the 'Genre' element, such as with the values of "main" "second", and "other".

The "href" attribute may signal the controlled vocabulary used in the 'Genre' element. After reviewing the set of programming guide elements and attributes; (1) Name; (2) Description; (3) AudioLanguage: (4) TextLanguage; (5) ParentalRating: (6) TargetUserProfile; and (7) Genre it was determined that, the receiving device still may have insufficient information defined within the programming guide to appropriately render the information in a manner suitable for the viewer. In particular, the traditional National Television System Committee (NTSC) television stations typically have numbers such as, 2, 4, 6, 8, 12, and 49. For digital services, program and system information protocol includes a virtual channel table that, for terrestrial broadcasting defines each digital television service with a two-part number consisting of a major channel followed by a minor channel. The major channel number is usually the same as the NTSC channel for the station, and the minor channels have numbers depending on how many digital television services are present in the digital television multiples, typically starting at 1. For example, the analog television channel 9, WUSA-TV in Washington, D.C., may identify its two over-the-air digital services as follows: channel 9-1 WUSA-DT and channel 9-2 9-Radar. This notation for television channels is readily understandable by a viewer, and the programming guide elements may include this capability as an extension to the programming guide so that the information may be computationally efficiently processed by the receiving device and rendered to the viewer.

Referring to FIG. 5, to facilitate this flexibility an extension, such as ServiceMediaExtension, may be included with the programming guide elements, which may specify further services. In particular, the ServiceMediaExtension may have a type element E1, a category NM/TM, with a cardinality of 1. The major channel may be referred to as MajorChannelNum, with a type element E2, a category NM/TM, a cardinality of 0.1, and a data type of string. By including the data type of string, rather than an unsigned Byte, permits the support of other languages which may not necessarily be a number. The program guide information, including the ServiceMediaExtension may be included in any suitable broadcasting system, such as for example, ATSC.

After further reviewing the set of programming guide elements and attributes; (1) Name; (2) Description; (3) AudioLanguage; (4) TextLanguage; (5) ParentalRating; (6) TargetUserProfile; and (7) Genre it was determined that the receiving device still may have insufficient information suitable to appropriately rendering the information in a manner suitable for the viewer. In many cases, the viewer associates a graphical icon with a particular program and/or channel and/or service. In this manner, the graphical icon should be selectable by the system, rather than being non-selectable.

Referring to FIG. 6, to facilitate this flexibility an extension may be included with the programming guide elements, which may specify an icon.

After further reviewing the set of programming guide elements and attributes; (1) Name; (2) Description; (3) AudioLanguage; (4) TextLanguage; (5) ParentalRating; (6) TargetUserProfile; and (7) Genre it was determined that the receiving device still may have insufficient information suitable to appropriately rendering the information in a manner suitable for the viewer. In many cases, the viewer may seek to identify the particular extension being identified using the same extension elements. In this manner, a url may be used to specifically identify the particular description of the elements of the extension. In this manner, the elements of the extension may be modified in a suitable manner without having to expressly describe multiple different extensions.

Referring to FIG. 7, to facilitate this flexibility an extension may be included with programming guide elements, which may specify a url.

Referring to FIG. 8, to facilitate this overall extension flexibility an extension may be included with the programming guide elements, which may specify an icon, major channel number, minor channel number, and/or url.

In other examples, instead of using Data Type "string" for MajorChannelNum and MinorChannelNum elements, other data types may be used. For example, the data, type unsignedInt may be used. In another example, a string of limited length may be used, e.g. string of 10 digits. An exemplary XML schema syntax for the above extensions is illustrated below.

```
[Object 1]
<xs:element name="ServiceMediaExtension " type="SerExtensionType"
minOccurs="0" maxOccurs="unbounded"/>
<xs:complexType name="SerExtensionType">
    <xs:sequence>
        <xs:element name="Icon" type="xs:anyURI" minOccurs="0"
            maxOccurs="unbounded"/>
        <xs:element name="MajorChannelNum"
            type="LanguageString"
            minOccurs="0" maxOccurs="1"/>
        <xs:element name="MinorChannelNum"
            type="LanguageString"
            minOccurs="0" maxOccurs="1"/>
    </xs:sequence>
    <xs:attribute name="url" type="xs:anyURI" use="required"/>
</xs:complexType>
```

In some examples the ServiceMediaExtension may be included inside a OMA "extension" element or may in general use OMA extension mechanism for defining the ServiceMediaExtension.

In some examples the MajorChannelNum and MinorChannelNum may be combined into one common channel number and represented. For example a ChannelNum string may be created by concatenating MajorChannelNum followed by a period ('•') followed by MinorChannelNum. Other such combinations are also possible with period replaced by other characters. Similar concept can be applied when using unsignedInt or other data, types to represent channel numbers in terms of combining MajorChannelNum and MinorChannelNum into one number representation.

In another example a MajorChannelNum•MinorChannelNum could be represented as "ServiceId" element (Service Id) for the service.

In another example, the ServiceMediaExtension may only be used inside a PrivateExt element within a Service fragment. An exemplary XML schema syntax for such an extension is illustrated below.

```
[Object 2]
    <element name=" ServiceMediaExtension " type="
    SerExtensionType ">
        <annotation>
            <documentation>
            This element is a wrapper for extensions to OMA BCAST SG
Service fragments. It may only be used inside a PrivateExt element
within a Service fragment.
            </documentation>
        </annotation>
</element>
<xs:complexType name="SerExtensionType">
    <xs:sequence>
        <xs:element name="Icon" type="xs:anyURI"
            minOccurs="0"
            maxOccurs="unbounded"/>
        <xs:element name="MajorChannelNum"
            type"LanguageString"
            minOccurs="0" maxOccurs="1"/>
        <xs:element name="MinorChannelNum"
            type="LanguageString"
            minOccurs="0" maxOccurs="1"/>
    </xs:sequence>
    xs:attribute name="url" type="xs:anyURI"
        use="required"/>
</xs:complexType>
```

In other examples some of the elements above may be changed from E2 to E1. In other examples the cardinality of some of the elements may be changed. In addition, if desired, the category may be omitted since it is generally duplicative of the information included with the cardinality.

It is desirable to map selected components of the Advanced Television Systems Subcommittee (ATSC) service elements and attributes to the OMA service guide service fragment program guide. For example, the "Description" attribute of the OMA service guide fragment program guide may be mapped to "Description" of the ATSC service elements and attributes, such as for example ATSC-Mobile Digital Television (DTV) Standard, Part 4—Announcement, other similar broadcast or mobile standards for similar elements and attributes. For example, the "Genre" attribute of the OMA service guide fragment program guide may be mapped to "Genre" of the MSC service elements and attributes, such as for example ATSC-Mobile DTV Standard, Part 4—Announcement, other similar standards for similar elements aid attributes. In one example Genre scheme as defined in Section 6.10.2 of ATSC A153 Part 4 may be utilized For example, the "Name" attribute of the OMA service guide fragment program guide may be mapped to "Name" of the ATSC service elements and attributes, such as for example ATSC-Mobile DTV Standard, Part 4-Announcement, other similar standards for similar elements and attributes. Preferably, the cardinality of the name is selected to be 0 . . . N, which permits the omission of the name which reduces the overall bit rate of the system and increase flexibility. For example, the "ParentalRating" attribute of the OMA service guide fragment program guide may be mapped to a new "ContentAdvisory" of the ATSC service element and attributes, such as for example ATSC-Mobile DTV Standard, Part 4—Announcement, or similar standards for similar elements and attributes. For example, the "TargetUserProfile" attribute of the OMA service guide fragment program guide may be mapped to a new "Personalization" of the ATSC service element and attributes, such as for example ATSC-Mobile DTV Standard, Part 4—Announcement, or similar standards for similar elements and attributes.

Referring to FIGS. 9A, 9B, 9C, the elements AudioLanguage (with attribute languageSDPTag) and TextLanguage (with attribute languageSDPTag) could be included if Session Description Fragment is included in the service announcement, such as for example ATSC-Mobile DTV Standard, Part 4—Announcement, or similar standards for similar elements and attributes. This is because the attribute languageSDPTag for the elements AudioLanguage and TextLanguage are preferably mandatory. This attribute provides identifier for audio and/or text language described by the parent element as used in the media sections describing audio and/or text track in a session description. In another example the attribute languageSDPTag could be made optional and the elements AudioLanguage and TextLanguage could be included with an Attribute "Langugage" with data type "string" which can provide language name.

An example XML schema syntax for this is shown below.

[Object 3]
```
<xs:complexType name="AudioOrTextLanguageType">
    <xs:simpleContent>
        <xs:extension base="LanguageString">
            <xs:attribute name="languageSDPTag" type="xs:string" use="optional"/>
            <xs:attribute name="language" type="xs:string" use="required"/>
        </xs:extension>
    </xs:simpleContent>
</xs:complexType>
```

In another example the attributes languageSDPTag for the elements AudioLanguage and TextLanguage could be removed. An example XML schema syntax for this is shown below.

[Object 4]
```
<xs:complexType name="AudioOrTextLanguageType">
    <xs:simpleContent>
        <xs:extension base="LanguageString">
            <xs:attribute name="language" type="xs:string" use="required"/>
        </xs:extension>
    </xs:simpleContent>
</xs:complexType>
```

Referring to FIGS. 10A, 10B, 10C, the elements AudioLanguage (with attribute languageSDPTag) and TextLanguage, (with attribute languageSDPTag) could be included if Session Description Fragment is included in the service announcement, such as for example ATSC-Mobile DTV Standard, Part 4—Announcement, or similar standards for similar elements and attributes. This is because the attribute languageSDPTag for the elements AudioLanguage and TextLanguage are preferably mandatory. This attribute provides identifier for audio and/or text language described by the parent element as used in the media sections describing audio and/or text track in a session description. In another example the attribute languageSDPTag could be made optional.

An example XML schema syntax for this is shown below:

[Object 5]
```
<xs:complexType name="AudioOrTextLanguageType">
    <xs:simpleContent>
        <xs:extension base="LanguageString">
            <xs:attribute name="languageSDPTag" type="xs:string" use="optional"/>
        </xs:extension>
    </xs:simpleContent>
</xs:complexType>
```

In another example the attributes languageSDPTag for the elements AudioLanguage and TextLanguage could be removed. An example XML schema syntax for this is shown below.

[Object 6]
```
<xs:complexType name="AudioOrTextLanguageType">
    <xs:simpleContent>
        <xs:extension base="LanguageString">
        </xs:extension>
    </xs:simpleContent>
</xs:complexType>
```

In another example the attribute "language" could be mapped to ATSC service "language" element and could refer to the primary language of the service. In another example the value of element "AudioLanguage" could be mapped to ATSC service "language" element and could refer to the primary language of the audio service in ATSC.

In another example the value of element "TextLanguage" could be mapped to ATSC service "language" element and could refer to the primary language of the text service in ATSC. In some cases the text service may be a service such as closed caption service. In another example the elements AudioLanguage and TextLanguage and their attributes could be removed.

For the service guide, traditionally the consideration has been to reference the linear stream of the audio-visual content, generally referred to as a "linear service". With the proliferation of applications also referred to as "apps" it is desirable to reference app based (i.e. application based) services which are other programs that are executed and provide a service to the user, generally referred to as "app-based service". It is desirable to map notification stream of the "linear service" or the "app-based service" using the Notification ServiceType element 7 of the OMA service guide fragment program guide.

It is also desirable to enable the notification of other services using the ServiceType element of the OMA service guide fragment program guide. The ServiceType may use the range "reserved for proprietary use" to include additional service types. For example, ServiceType element value 224 may be used to identify an "App-Based Service" that includes an application component to be used, For example, ServiceType, element value 225 may be used to identify an "App-Based Service" that includes non-real time content to be used. For example, ServiceType element value 226 may be used for to identify an "App-Based Service" that includes an on-demand component to be used. In this manner, these app-based services are mapped to the Notification Service-Type element 7, and thus are readily omitted when the Notification ServiceType element 7 does not indicate their existence, thereby reducing the complexity of the bitstream.

In another example, rather than mapping the notification to the value of 7 for OMA ServiceType, an additional ServiceType value may be defined. A Notification Service-Type element 227 of the OMA service guide fragment program guide may be used to identify an "App-Based Service" that includes an application component to be used including a notification stream component.

It is to he understood that other values may likewise be used for the described services. For example instead of ServiceType element value 224, ServiceType element value 225 ServiceType element value 226, and ServiceType element value 227 above the ServiceType element value 240, ServiceType element value 241, ServiceType, element value 242, or ServiceType, element value 243 may be used. In another case ServiceType element values 129. ServiceType element value 130, ServiceType element value 131, or ServiceType element value 132 may instead be used.

In another example instead if using ServiceType values from the range (128-255) reserved for proprietary use, the values from the range 11-127) reserved for future use may be used.

In another example when using OMA BCAST Guide 1.1 from instead if using ServiceType values from the range (128-255) reserved for proprietary use, the values from the range (14-127) reserved for future use may be used.

In another example when using OMA BCAST Guide 1.1 from [instead if using ServiceType values from the range 128-255) reserved for proprietary use, the values from the range (128-223) reserved for other OMA enablers may be used.

In another example when using OMA BCAST Guide 1.1 from instead if using ServiceType values from the range (128-255) reserved for proprietary use, the values may be restricted in the range (221-255) reserved for other OMA enablers may be used In another example, for example, an additional Service-Type element value 228 may be used to identify a "Linear Service". For example, an additional ServiceType element value 229 may be used to identify an "App-Based Service" that includes a generalized application based enhancement. In this manner, the service labeling is simplified by not expressly including services type for application component, non-real time content, nor on-demand component.

In another example, for example, an additional or alternative ServiceType element value 230 may be used for to identify an "App-Based Service" that includes an application based enhancement. In this manner, the notification is further simplified by not expressly including services type for linear service, application component, non-real time content, nor on-demand component.

In another example, for example, the ServiceType element value 1 also may be used for to identify a "Linear Service". In this manner, the Linear Element is incorporated within the existing syntax structure, In this case the "Linear service" is mapped to Basic TV service.

In another example, for example, the ServiceType element value 11 may be used for to identify a streaming on demand component, which may be an app-based service with app-based enhancement including an on demand component. For example, ServiceType element value 12 may be used to identify a file download on demand component, which may be an app-based enhancement including a non-real time content item component.

In another example, any one of the above service type values may be indicated by a value within another element. For example, an AvailableContent element or attribute and its values could take one of the values from application component, non-real time content, on-demand component, and/or notification.

In another example, the ServiceType value allocation may be done hierarchically. For example, the main service types may be a linear service and an app-based service, and each of these two types of services could include zero or more app-based enhancements components which can include application component, non-real time content, on demand component, and/or notification, a hierarchical allocation of ServiceType values may be done. In this case for "Service-Type" one of the bits of "unsigned Byte" (date type of ServiceType) could be used to signal a linear service (bit with value set to 1) or an app-based service (bit with value set to 0). Then the rest of the bits can signal the service types.

An example is illustrated as follows:

224 (11100000 binary) Linear Service with App-Based Enhancement, including application component 240 (11110000 binary) App-Based Service with App-Based Enhancement including application component 225 (11100001 binary) Linear Service App-Based Enhancement including non-real time content 241 (111100001 binary) App-Based Service with App-Based Enhancement including non-real time content 226 (11100010 binary) Linear Service)-Based Enhancement including on demand component 242 (11110010 binary) App-Based Service with App-Based Enhancement including on demand component 227 (1110001 binary) Linear Service with App-Based Enhancement including notification stream component 243 (11110011 binary) App-Based Service with App-Based Enhancement including notification stream component 228 (11100100 binary) Linear Service with generic service type 243 (11110100 binary) App-Based Service with generic service type The generic service type may refer to the service different than a service, which has application component or non-real-time content, or on demand component. In some case the generic service type may be an "unknown" service type.

In another example, the values may use contiguous ServiceType values, For example the service type values could be assigned as follows:

224 Linear Service with App-Based Enhancement including application component

225 App-Based Service with App-Based Enhancement including application component 226 Linear Service with App-Based Enhancement including non-real time content 227 App-Based Service with App-Based Enhancement including non-real time content 228 Linear Service with App-Based Enhancement including on demand component 229 App-Based Service with App-Based Enhancement including on demand component 230 Linear Service with App-Based Enhancement including notification stream component 231 App-Based Service with App-Based Enhancement including notification stream component In another example the Linear and/or App-based service: App may be further split into two service types (and thus four total service types as) follows:

Linear service: primary App (e.g. ServiceType value 224)

Linear service: non primary app. (e.g. ServiceType value 225)

App-based service: primary App (e.g. ServiceType value 234)

App based service: non primary app. (e.g. ServiceType value 235)

Where a Primary App, may be an app which is activated as soon as the underlying service is selected. Also non-primary apps may be started later in the service.

In some examples, the service of the type Linear Service: On-Demand component may be forbidden. In that case, no ServiceType value may be assigned for that type of service.

Additional examples related to service signaling are described as follows. In general service announcement and service signaling may be as follows, Service Announcement may include information about programming and services that is designed to allow the viewer or user to make an informed selection about service or content. Service Signaling may include information that enables the receiver to locate and acquire services and to perform basic navigation of the service.

Referring to FIG. 11 component information description signaling is described. The transmission service provider 1100 is an example of a provider of service configured to enable television services to be provided. For example, transmission service provider 1100 may include public over-the-air television networks, public or subscription-based satellite television service provider networks, over-the-top service networks, broadcast service networks, and public or subscription-based cable television provider networks. It should be noted that although in some examples transmission service provider 1100 may primarily be used to enable television services to be provided, transmission service 1100 provider may also enable other types of data and services to be provided according to any combination of the telecommunication protocols and messages described herein. Transmission service provider 1100 may comprise any combination of wireless and/or wired communication media. Transmission service provider 1100 may include coaxial cables, fiber optic cables, twisted pair cables, wireless transmitters and receivers, routers, switches, repeaters, base stations, or any other equipment that may be useful to facilitate communications between various devices and sites.

With respect to FIG. 11, receiver 1140 may include any device configured to receive a service from transmission service provider 1100. For example, a receiver 1140 may be equipped for wired and/or wireless communications and may include televisions, including so-called smart televisions, set top boxes, and digital video recorders. Further, the receiver 1140 may include desktop, laptop, or tablet computers, gaming consoles, mobile devices, including, for example, smartphones, cellular telephones, and personal gaming devices configured to receive service from transmission service provider 1100.

As a part of receiving service from transmission service 1100, the receiver 1140 may receive signaling information which may provide information about various media streams and data that may be received via delivery mechanism. In one example the signaling information from transmissions service provider 1100 may include component information description 1110. An example of component, information description is provided later with respect to FIGS. 13A, 13B, 15, and 17. After receiving this component information description 1110, the receiver 1140 may parse it or decode it. In one example the receiver 1140 may not be able to parse further signaling information until it parses the component information description 1110. In one example the receiver 1140 may display some or all of component information description 1110 to the viewer after decoding, parsing and rendering it. In some cases it may display this information on screen of the receiver device which can be viewed by the viewer. In an example case the viewer may make a decision based on this information that is received, parsed and displayed. In one example the decision may be to receive one or more components of the service. In this case the receiver 1140 may send a components delivery request 1120 for one or more components of the service to the transmission service provider 1100. In one example the receiver 1140 may receive delivery of requested components from transmission service provider 1100.

Figure 12:
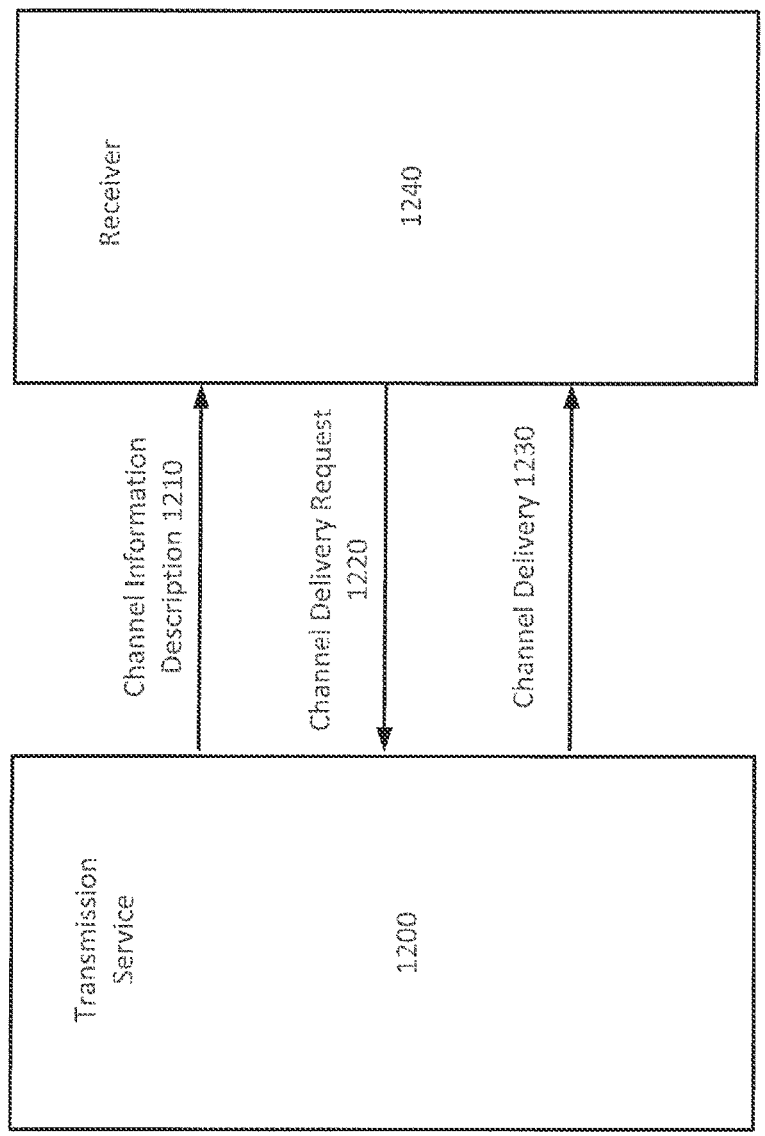
FIG. 12 illustrates channel information description signaling.

Referring to FIG. 12, channel information description signaling is described. The transmission service provider 1200 is an example of a provider of service configured to enable television services to be provided. For example, transmission service provider 1200 may include public over-the-air television networks, public or subscription-based satellite television service provider networks, over-the-top service networks, broadcast service networks, and public or subscription-based cable television provider networks. It should be noted that although in some examples transmission service provider 1200 may primarily be used to enable television services to be provided, transmission service provider 1200 may also enable other types of data and services to be provided according to any combination of the telecommunication protocols and messages described herein. Transmission service provider 1200 may comprise any combination of wireless and/or wired communication media. Transmission service provider 1200 may include coaxial cables, fiber optic cables, twisted pair cables, wireless transmitters and receivers, routers, switches, repeaters, base stations, or any other equipment that may be useful to facilitate communications between various devices and sites.

Referring to FIG. 12, the receiver 1240 may include any device configured to receive a service from transmission service provider 1200. For example, the receiver 1240 may be equipped for wired and/or wireless communications and may include televisions, including so-called smart televisions, set top boxes, and digital video recorders. Further, the receiver 1240 may include desktop laptop, or tablet computers, gaming consoles, mobile devices, including, for example, smartphones, cellular telephones, and personal gaining devices configured to receive service from transmission service provider 1200.

As a part of receiving service from transmission service provider 1200, the receiver 1240 may receive signaling information which may provide information about various media streams and data that may be received via delivery mechanism. In one example the signaling information from transmissions service provider 1200 may include channel information description 1210. An example of channel information description is provided later with respect to FIGS. 14A, 14B, 16, and 18. After receiving this channel information description 1210, the receiver 1240 may parse it or decode it. In one example the receiver 1240 may not be able to parse further signaling information until it parses the channel information description 1210. In one example the receiver 1240 may display seine or all of channel information description 1210 to the viewer after decoding, parsing and rendering it. In some cases it, may display this information on screen of the receiver device 1240 which can be viewed by the viewer. In an example case the viewer may make a decision based on this information that is received, parsed and displayed. In one example the decision may he to receive channel of the service. In this case the receiver 1240 may send a channel delivery request 1220 for the service to the transmission service provider 1200. In one example the receiver 1240 may receive delivery of channel from transmission service 1200.

FIGS. 13A-13B illustrate a binary syntax for a component information descriptor.

FIG. 13B includes fewer syntax elements compared to FIG. 13A and thus may be easier to transmit by the transmission service provider 1100 and may be easier to parse and decode by the receiver 1140.

The Component Information Descriptor of FIG. 13A and FIG. 13B provides information about the components available in the service. This includes information about number of components available in the service. For each available component following information is signaled: component type, component role, component name, component identifier, component protection flag. Audio, video, closed caption and application components can be signaled. Component role values are defined for audio, video and closed caption components.

The syntax for the Component Information Descriptor may conform to the syntax shown in FIG. 13A or FIG. 13B. In another example instead of all of the component information descriptor only some of the elements in it maybe signaled in the component information descriptor or inside some other descriptor or some other data structure.

Semantic meaning of the syntax elements in the component information descriptor of FIG. 13A and FIG. 13B may be as follows. descriptor_tag—This is 8-bit unsigned integer for identifying this descriptor. Any suitable value between 0-255 which uniquely identifies this descriptor can be signaled. In one example the format of this field may be uimsbf. In another example some other format may be used which allows identifying the descriptor uniquely compared to other descriptors based on this dcscriptor_tag value.

descriptor_length—This 8-bit unsigned integer may specify the length (in bytes) immediately following the field num_components up to the end of this descriptor. In some examples instead of 8-bit, this field may be 16-bit.

num_comonents—This 8-bit unsigned integer field may specify the number of components available for this service. The value of this field may be in the range of 1 to 127 inclusive. Values 128-255 are reserved. In an alternative example this field may be split into two separate fields: a 7-bit unsigned integer field num_components and a 1 bit reserved field.

component_type—This 3-bit unsigned integer may specify the component type of this component available in the service. Value of 0 indicates an audio component. Value of 1 indicates a video component. Value of 2 indicated a closed caption component. Value of 3 indicates an application component. Values 4 to 7 are reserved.

component_role—This 4-bit unsigned integer may specify the role or kind of this component. The defined values include one or more:

For audio component (when component_type field above is equal to 0) values of component_role are as follows:
[Object 8]
   0=Complete main,
   1=Music and Effects,
   2=Dialog,
   3=Commentary,
   4=Visually Impaired,
   5=Hearing Impaired,
   6=Voice-Over,
   7-14=reserved.
   15=unknown In another example additionally component_role values for audio may be defined as follows: 7=Emergency. 8=Karaoke. In this case the values 9-14 will be reserved and 15 will be used to signal unknown audio role.

For Video (when component_type field above is equal to 1) values of component_role are as follows:
[Object 9]
   0=Primary video,
   1=Alternative camera view,
   2=Other alternative video component,
   3=Sign language inset,
   4=Follow subject video.
   5=3D video left view,
   6=3D video right view,
   7=3D video depth information,
   8=Part of video array <x,y> of <n,m>,
   9=Follow-Subject metadata,
   10-14=reserved,
   15=unknown For Closed Caption component (when component_type field above is equal to
2) values of component_role are as follows:
   0=Normal,
   1=Easy reader,
   2-14=reserved,
   15=unknown.

When component_type field above is between 3 to 7, inclusive, the component_role may be equal to 15.

component_protected_flag—This 1-bit flag indicates if this component is protected (e.g. encrypted). When this flag is set to a value of 1 this component is protected (e.g. encrypted). When this flag is set to a value of 0 this component is not protected (e.g. encrypted).

component_id—This 8-bit unsigned integer nay specify the component identifier of this component available in this service. The component_id may be unique within the service.

component_name_length—This 8-bit unsigned integer may specify the length (in bytes) of the component_name_bytes( ) field which immediately follows this field.

component_name_bytes( )—Short human readable name of the component in "English" language. Each character of which may be encoded per UTF-8.

With respect to FIG. 13A, FIG. 13B, FIG. 14A, FIG. 14B the format column of the descriptor may be interpreted as follows.

[Object 10]
TBD: means to be deckled as described above.
uimsbf: means Unsigned Integer, Most Significant Bit First,
bslbf: means Bit string, left bit first.

FIGS. 14A-14B illustrate a binary syntax for a channel information descriptor. The Channel Descriptor of FIG. 14A and FIG. 14B provides information about the channel(s) in the service. This includes Major channel number, minor channel number, primary channel language, channel genre, channel description (in multiple languages) and channel icon.

The syntax for the Channel Descriptor may conform to the syntax shown in FIG. 14A or FIG. 14B. In another example instead of all of the channel descriptor only some of the elements in it maybe signaled in the channel descriptor or inside some other descriptor or some other data structure.

Semantic meaning of the syntax elements in the channel descriptor of FIG. 14A and FIG. 14B is as follows.

descriptor_tag—This is 8-bit unsigned integer for identifying this descriptor. Any suitable value between 0-255 which uniquely identifies this descriptor can be signaled. In one example the format of this Held may be uimsbf. In another example some other format may be used which allows identifying the descriptor uniquely compared to other descriptors based on this descriptor_tag value.

descriptor_length—This 8-bit unsigned integer may specify the length (in bytes) immediately following this field up to the end of this descriptor.

major_channel_num—This 16-bit unsigned integer may specify the major channel number of the service. In another example the bit width of 8-bit or 12-bit may he used for this field instead of 16-bit.

minor_channel_num—This 16-bit unsigned integer may specify the minor channel number of the service in the case of channel descriptor shown in FIG. 14A. In another example the bit width of 8-bit tor 12-bit may be used for this field instead of 16-bit.

In the case of channel descriptor shown in FIG. 14B the bit width is changed to 15-bit. Thus for FIG. 14B this 15-bit unsigned integer may specify the minor channel number of the service. In another example the bit width of 7-bit or 11-bit may be used for this field instead of 15-bit.

service_lang_code—Primary language used in the service. This field may consist of one of the 3 letter code in International Standard Organization (ISO) ISO 639-3 titled "Codes for the representation of names of languages—Part 3: Alpha-3 code for comprehensive coverage of languages available at http://www.iso.org which is incorporated by reference in its entirety here by reference. In other examples a pre-defined list of languages may be defined and this filed can be an index into the list of those fields. In an alternate example 16 bits may be used for this field since upper bound for the number of languages that can he represented is 26×26×26 i.e. 17576 or 17576·547=17030.

service_lang_genre—Primary genre of the service. The service_lang_genre clement may be instantiated to describe the genre category for the service. The <classification-SchemeURI> is http://www.atsc.org/XMLSchemas/mh/2009/1.0/genre-cs/ and the value of service_lang_genre may match a termID value from the classification schema in Annex B of A/153 Part 4 document titled "ATSC-Mobile DTV Standard. Part 4—Announcement" available at http://www.atsc.org which is incorporated in its entirety here by reference.

icon_url_length—This 8-bit unsigned integer may specify the length (in bytes) of the icon_url_bytes( ) field which immediately follows this field.

icon_url_bytes( )—URL for the icon used to represent this service. Each character may be encoded per Unicode Transmission Format (UTF)-8. service_descriptor_length—This 8-bit unsigned integer may specify the length (in bytes) of the service_descr_bytes( ) field which immediately follows this field.

servieo_descr_bytes( )—Short description of the service. Either in "English" language or in the language identified by the value of service_lang_code field in this descriptor. Each character of which may be encoded per UTF-8.

The values of icon_url_length and service_descriptor_length are constrained as specified by the value of the descriptor_length field which provides information about the length of this entire descriptor.

With respect to FIG. 14B and additional syntax element is as follows:

ext_channel_info_preeent_flag—This 1-bit Boolean flag that may indicate, when set to '1', that extended channel information fields for this service including the fields service_lang_code, service_genre_code, serviee_descr_length, service_descr_bytes( ), icon_url_length, icon_url_bytes( ) are present in this descriptor. A value of '0', may indicate that extended channel information fields for this service including the fields service_lang_code, service_genre_code, service_descr_length. service_descr_bytes( ), icon_url_length, icon_url_bytes( ) are not present in this descriptor.

Thus when using the channel descriptor shown in FIG. 14B by setting the ext_channel_jnfo_present_flag value to 1 fewer elements compared to FIG. 14A can be signaled in the descriptor and thus it may be easier to transmit by the transmission service provider 1200 and may be easier to parse and deeode by the receiver 1240.

In some examples it may be a requirement of bitstream conformance that when channel information descriptor (e.g. FIG. 14B) is included in a fast information channel then ext_channel_info_present_flag may be equal to 0. In another example when channel information descriptor (e.g. FIG. 14B) is included for signaling in a location where bit efficiency is required then ext_channel_info_present_flag may be equal to 0.

In another example it may be a requirement of a bitstream conformance that ext_channel_info_present_flag may be equal to 1.

In addition to the binary syntax of FIG. 13A or FIG. 13B for the component information descriptor, a different representation may be used. FIG. 15 illustrates a XML syntax and semantics for a component information descriptor. FIG. 17 illustrates a XML schema for a component information descriptor.

In addition to the binary syntax of FIG. 13A or FIG. 13B for the channel information descriptor, a different representation may be used. FIG. 16 illustrates a XML syntax and semantics for a channel information descriptor.

FIG. 18 illustrates a XML schema for a channel information descriptor.

Description about various XML schemas and namespaces is provided below. XML schema for User Service Bundle Description for MMT is also described below. User Service Bundle Description provides signaling information which is used for accessing a service.

FIGS. 19A-C illustrate an example User Service Bundle Description Fragment for Motion Picture Experts Group (MPEG) media transport. Various elements along with their semantics definition are shown in FIGS. 19A-C. The user service bundle description forms part of signaling of ATSC.

With respect to FIGS. 19A-C, content delivery includes two options for supporting streaming and/or file download through ATSC broadcast physical layer: (1) MPEG Media Transport Protocol (MMTP) over User Datagram Protocol (UDP) and Internet Protocol (IP) and (2) Real time Object delivery over Unidirectional Transport over UDP and IP. MMTP is described in ISO/IEC: ISO/IEC 23008-1, "Information technology-High efficiency coding and media delivery in heterogeneous environments-Part 1: MPEG media transport (MMT)," which is incorporated by reference herein in its entirety. In the case where MMTP is used for streaming video data, video data may be encapsulated in a Media Processing Unit (MPU). MMTP defines a MPU as "a media data item that may be processed by an MMT entity and consumed by the presentation engine independently from other MPUs." A logical grouping of MPUs may form an MMT asset, where MMTP defines an asset as "any multimedia data to be used for building a multimedia presentation. An asset, is a logical grouping of MPUs that share the same asset identifier for carrying encoded media data." One or more assets may form a MMT package, where a MMT package is a logical collection of multimedia content. A MMT Package Table (MPT), also called MP Table is a message defined in ISO/IEC 23008-1 as "this message type contains an MP (MPT message) table that provides all or a part of information required for a single package consumption." This is also referred to as MP Table message.

With respect to FIGS. 19A-C, a physical layer pipe (PLP) may generally refer to a logical structure including all or portions of a data stream. In an example, a PLP is included within the payload of a physical layer frame.

FIGS. 20A-C provide a XML schema for MMT USBD which corresponds to the elements and attributes shown in table structure shown in FIGS. 19A-C for MMT USBD.

FIGS. 22A-C show a variant XML schema for MMT USBD. The XML schema in FIGS. 20A-C and FIGS. 22A-C include:

---

[Object 11]
  Various custom XML data types definitions (XML complexType and XML simpleType). This includes following:
    Data type for Port is defined based on XML unsignedShort with value of 0 excluded.
    Pattern based data type for IP address is defined to allow only valid IP Version 4 (IPv4) addresses.
    Data type for Physical Layer Pipe (PLP) identifier is defined to be a valid PLP value.

---

These definitions make it efficient to define MMS USBD at the same time preventing an illegal value to be specified for an element, or attribute.

The difference between XML schema shown in FIGS. 22A-C and XML schema shown in FIGS. 20A-C is as follows:

In FIGS. 22A-C an additional namespace (xmlns:slt) used is referred as follows:
xmlns:slt=http://www.atsc.org/XMLSchemas/ATSC3/Delivery/SLT/1.0/.

In FIGS. 22A-C, the xsd for service list table (SLT) schema is imported as follows: <xs:import schemaLocation="SLT.xsd" namespace="http://www.atsc.org/XMLSchemas/ATSC3/Delivery/SLT/1.0/"/22 .

In FIGS. 22A-C, the serviceId attribute from another schema (e.g. service list table schema) is used with use of XML ref attribute as follows: <xs:attribute ref="slt:serviceId" use="required"/>.

Figure 21A:
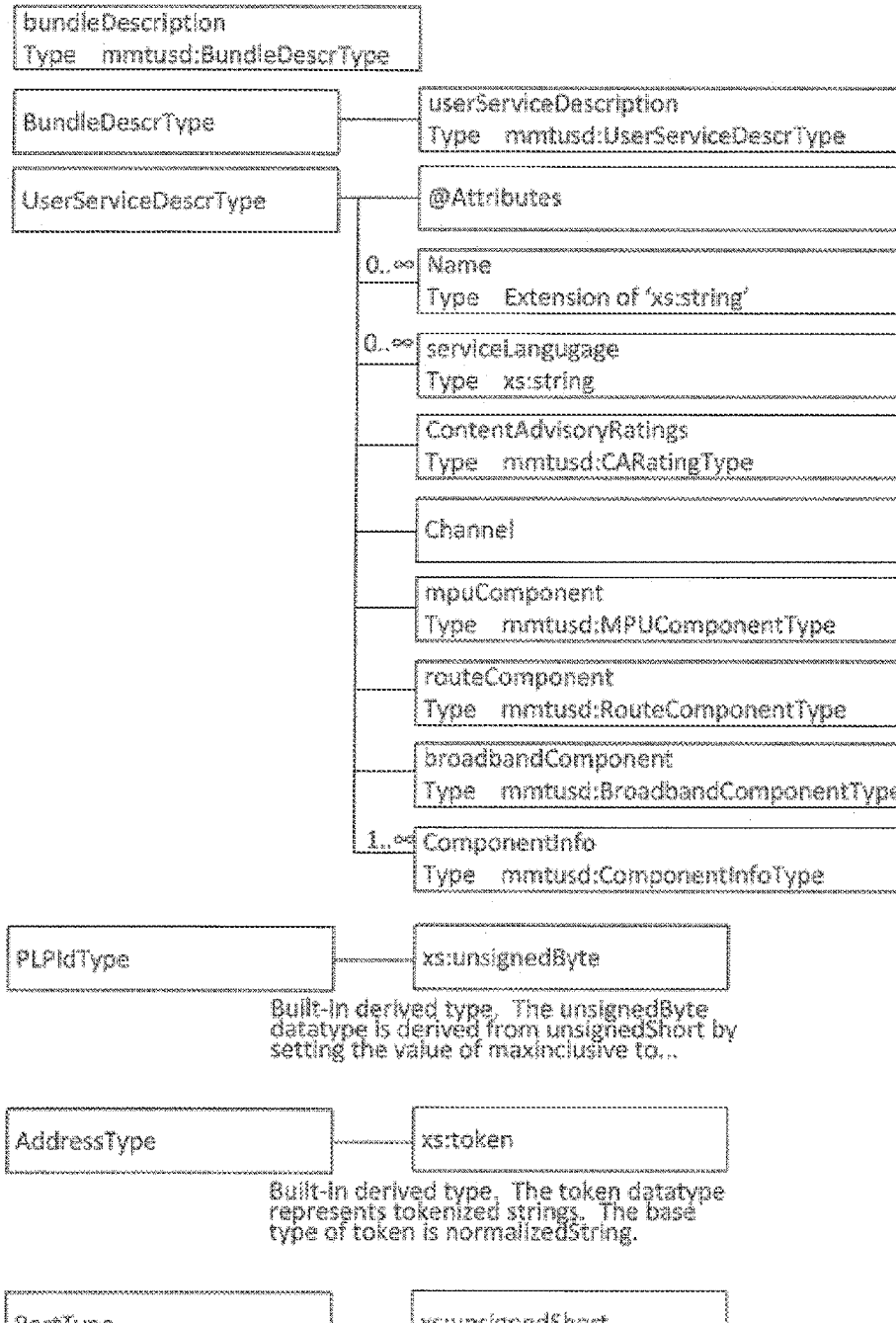
FIG. 21A illustrates structure of XML schema for MMT USBD.
Figure 21B:
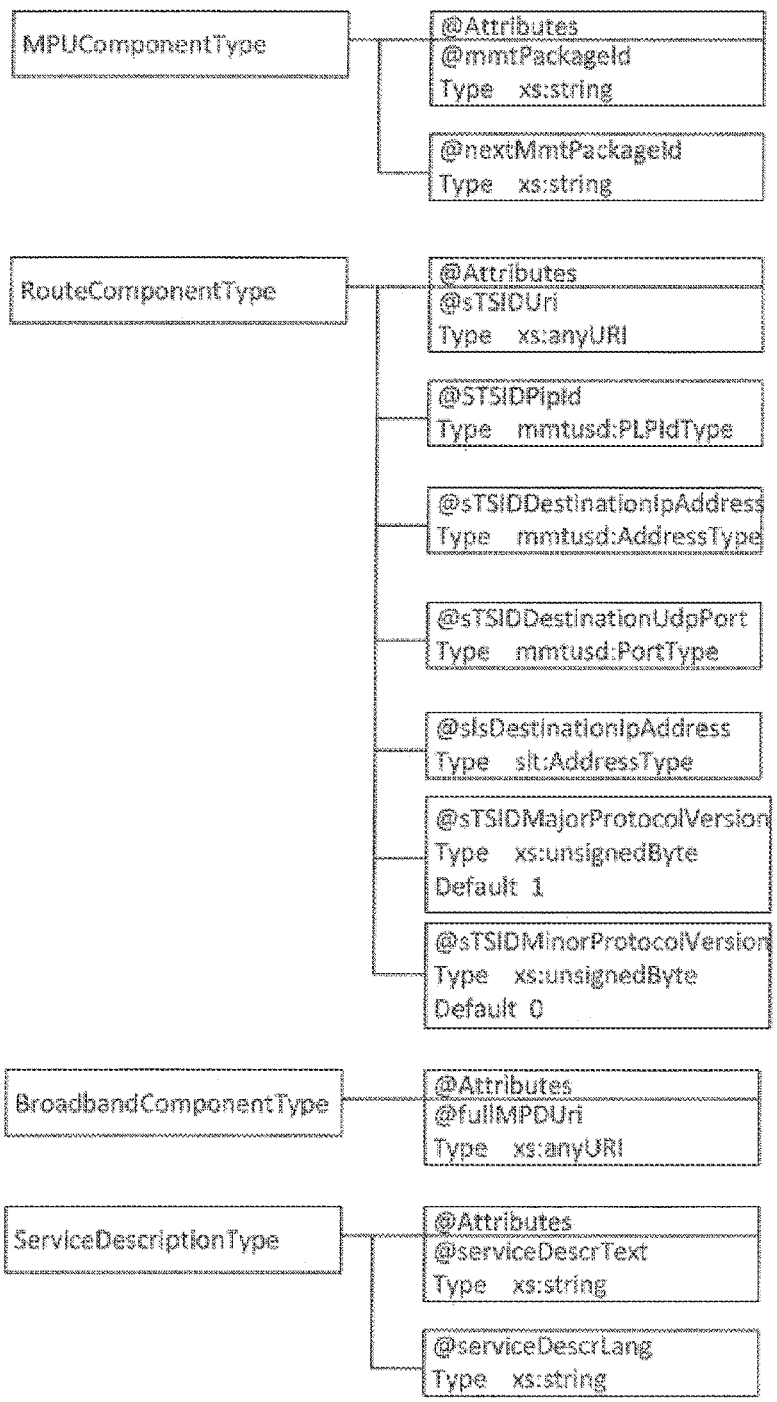
FIG. 21B illustrates structure of XML schema for MMT USBD.
Figure 21:
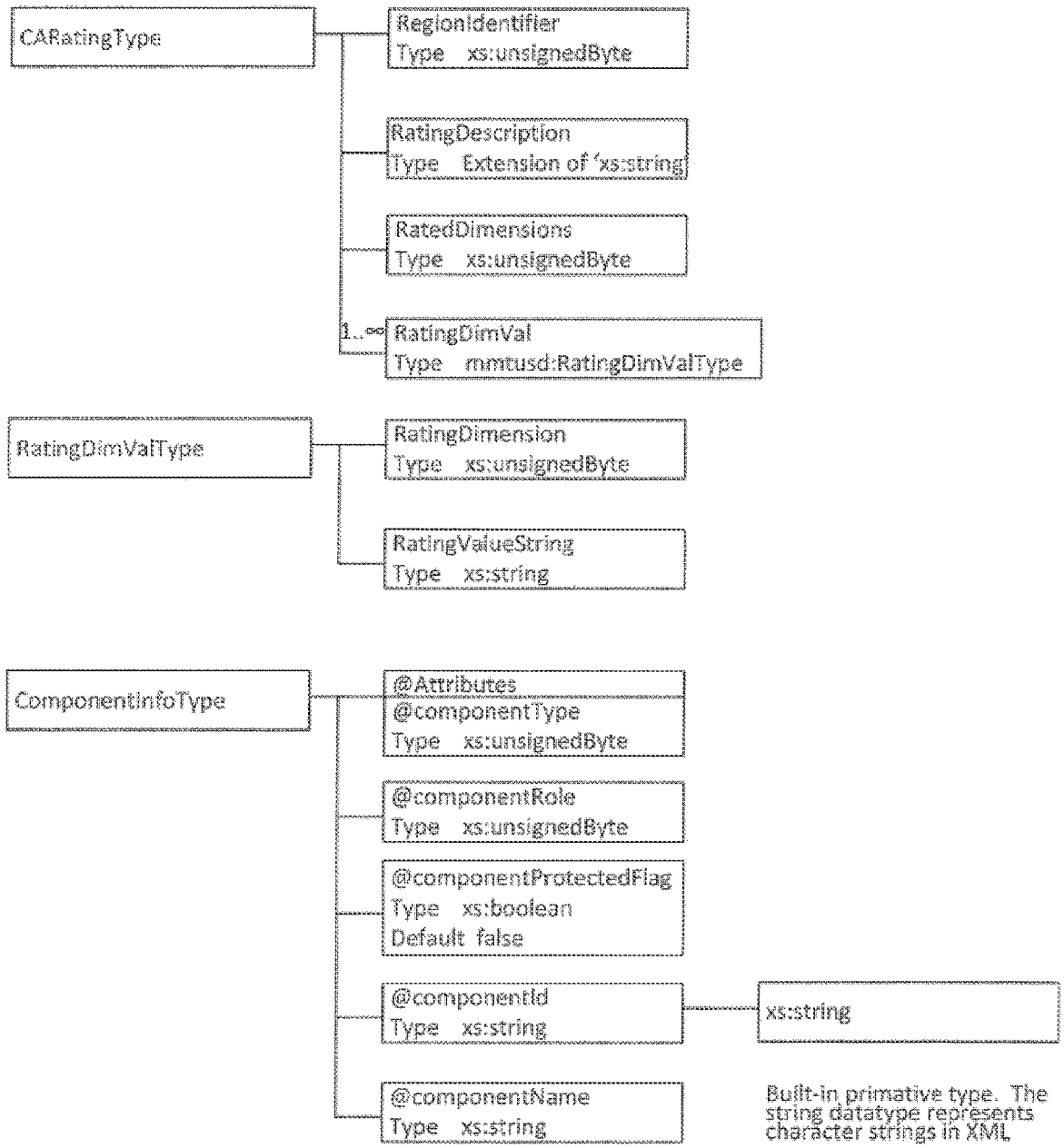
FIG. 21C illustrates structure of XML schema for MMT USBD.

FIGS. 21A-C show the XML schema structure in a graphical figure format.

The namespace description and rules for the schema may be defined as below. A general description of XML Schema and Namespaces is also provided below.

A number of XML elements may be defined and used for service signaling and delivery. These elements may correspond to following situations:

To provide various service signaling elements and attributes defined for low level signaling, service layer signaling and ROUTE protocol To use and extend elements and attributes defined by 3GPP MBMS for ATSC 3.0 USBD fragment.

These XML elements may be defined with separate namespaces in each individual schema documents. The namespaces used by various schemas may be described when defining various individual schemas. The sub-string part of namespaces between the right-most two '/' delimiters indicate major and minor version of the schemas. The schemas defined initially may have version '1.0', which indicates major version is 1 and minor version is 0.

In order to provide flexibility for future changes in the schema, decoders of XML documents with the namespaces defined currently should ignore any elements or attributes they do not recognize, instead of treating them as errors.

In the event of any discrepancy between the XML schema definitions implied by the table that appear in this document (e.g. FIGS. 19A-C) and those that appear in the XML schema definition files (e.g. FIGS. 20A-C or FIGS. 22A-C), those in the XML schema definition files are authoritative and may take precedence.

The XML schema document for the schemas defined in this document may be found at the ATSC website.

Description about formal, valid XML schema for MMT USBD is provided below. This explanation is with respect to the XML schema shown in FIGS. 20A-C and FIGS. 22A-C and the XML schema structure shown in FIGS. 21A-C.

The bundle Description may be represented as an XML document containing a bundleDescription root element that conforms to the XML Schema. Examples of such a schema file are shown in FIGS. 20A-C and explanation about "XML Schema and Namespace" is provided above.

The ATSC extensions to the MBMS USBD fragment ay be as specified in the XML schema that has namespace:
http://www.atsc.org/XMLSchemas/ATCS(3/Delivery/MMTUSD/1.0/

The abbreviation "mmtusd" should be used as the namespace prefix for any of the elements of this MMT USBD schema, if they appear in an XML document. The binding of this prefix to the namespace can be declared by including the following attribute in the schema element of the XML document, xmlns:mmtusd="http://www.atsc.org/XMLSchemas/ATSC3Delivery/MMTUSD/1.0"

In a variant example a single namespace may be defined and used for various signaling related schemas. In this case following description may apply to namespace definition.

A number of XML elements may be defined and cased for service signaling and delivery. These elements correspond to following situations:

To provide various service signaling elements and attributes defined for low level signaling, service layer signaling and ROUTE protocol.

To use and extend elements and attributes defined by 3GPP MEMS for ATSC 3.0 USBD fragment.

These XML elements may be defined with a single common namespace. The sub-string part of namespace between the right-most two '/' delimiters indicate major and minor version of the schemas. The schemas defined initially may have version '1.0', which indicates major version is 1 and minor version is 0.

In order to provide flexibility for future changes in the schema, decoders of XML documents with this namespace defined currently should ignore any elements or attributes they do not recognize, instead of treating them as errors.

In the event of any discrepancy between the XML schema definition implied by the table that appear in this document (e.g. FIGS. 19A-C) and those that appear in the XML schema definition files (e.g. FIGS. 20A-C or FIGS. 22A-C), those in the XML schema definition files are authoritative and may take precedence.

The XML schema document for the schemas defined in this document may be found at the ATSC website.

In a variant example when using a signaled namespace for various signaling related schemas, following may apply.

Description about formal, valid XML schema for MMT USBD may be as follows. This explanation is with respect to the XML schema shown in FIGS. 20A-C and FIGS. 22A-C and the XML schema structure shown in FIGS. 21A-C.

The bundleDescription may be represented as an XML document containing a bundleDescription root element that conforms to the XML schema. Examples of such a schema file are shown in FIGS. 20A-C and explanation about "XML Schema and Namespace" is provided above.

The ATSC extensions to the MBMS USBD fragment may be as specified in the XML schema that has namespace: http://www.atsc.org/XMLSchemas/ATSC3/Delivery/Signaling/1.0/

The abbreviation "atscsig" should be used as the namespace prefix for any of the elements of the ATSC signaling schemas, if they appear in an XML document. The binding of this prefix to the namespace can be declared by including the following attribute in the schema element of the XML document. xmlns:atscsig="http://www.atsc.org.XMLSchemas/ATSC3/Delivery/Signaling/1.0"

In another variant example the actual Uniform Resource Indicator (URL) values defined above for a namespace may instead be changed.

For example instead of URL:
http://www.atsc.org/XMLSchemas/ATSC3/Delivery/MMTUSD/1.0/
the URL:
http://www.atsc.org/XMLSchemas/MMTUSD/1.0/may be used.

In another variant example the actual URL values defined above for a namespace may instead be changed so as to not include the version number.

For example instead of URL:
http://www.atsc.org/XMLSchemas/ATSC3/Delivery/MMTUSD/1.0/
the URL:
http://www.atsc.org/XMLSchemas/MMTUSD/ may be used.

It should be noted that the URLs above use a slash ('/') delimiter as its last characters. In some examples this slash ('/') delimiter as last character may be omitted from the URLs.

For example instead of URL:
http://www.atsc.org/XMLSchemas/ATSC3/Delivery/MMTUSD/1.0/the URL:
http://www.atsc.org/XMLSchemas/ATSC3Delivery/MMTUSD/1.0 may be used.
Similarly
For example instead of URL:
http://www.atsc.org/XMLSchemas/ATSC3Delivery/MMTUSD the URL;
http://www.atsc.org/XMLSchemas/ATSC3/Delivery/MMTUSD may be used. For example instead of URL:
http://www.atsc.org/XMLSchemas/MMTUSD/1.01/ the URL;
http://www.atsc.org/XMLSchemas/MMTUSD/1.0 may be used.
For example instead of URL:
http://www.atsc.org/XMLSchemas/MMTUSD/ the URL:
http://www.atsc.org/XMLSchemas/MMTUSD may be used.

With respect to FIGS. 19A-C to FIGS. 22A-C, instead of using data type xml:lang to represent language the datatype xs:language may be used.

With respect to FIGS. 19A-C to FIGS. 22A-C, instead of using data type xs:string, in some cases the data type xs:token may be used.

With respect to FIGS. 19A-C to FIGS. 22A-C, instead of using data type xs:string. in some cases the data type StringNoWhitespaceType may be used, where the StringNoWhitespaceTpye is defined as follows:

[Object 12]
```
<xs:simpleType name="StringNoWhitespaceType">
    <xs:restriction base="xs:string">
        <xs:pattern value="[^\r\n\t \p{Z}]*"/>
    </xs:restriction>
</xs:simpleType>
```

As described previously one of the options for content delivery for streaming and/or file download through ATSC broadcast physical layer is Real-time Object delivery over Unidirectional Transport over UDP and IP. Additional description is provided regarding ROUTE delivery.

A User Service Bundle Description fragment with various elements, attributes and their semantic description for ROUTE is shown in FIGS. 23A-B. With respect to FIGS. 23A-B DASH is further described in "ISO/IEC 23009-1 Dynamic Adaptive Streaming over HTTP (DASH)—Part 1: Media presentation description and segment formats". The root element of ROUTE User Service Bundle Description fragment is bundleDescription element.

The bundleDescription may be represented as an XML document containing a bundleDescription root element that conforms to the definitions in the XML schema that has namespace:
http://www.atsc.org/XMLSchemas/ATSC3/Delivery/ROUTEUSD/1.0/

The abbreviation "routeusd" should be used as the namespace prefix for any of the elements of this ROUTE user service description schema, if they appear in an XML document. For the initial release of this Standard the binding of this prefix to the namespace can be declared by including the following attribute in the schema element of the XML document. xmlns:routeusd="http://www.atsc.org/XMLSchemas/ATSC3Delivery/ROUTEUSD/1.0/"

The normative XML schema for ROUTE USBD is shown in FIG. 24.

Service Transport Session Instance Description (S-TSID) fragment referred by ROUTE USBD in FIGS. 23A-B via attribute@sTSIDUri is described further. S-TSID fragment is shown in FIG. 25. The S-TSID is the service level signaling metadata fragment that contains the overall transport session description information for the zero or more ROUTE sessions and constituent Layered Coding Transport (LCT) sessions in which the media, content components of an ATSC 3.0 service are delivered. S-TSID fragment is shown in FIG. 26. A LCT session (associated with the service component(s) it carries) is identified by a Transport Session Identifier (TSI) which is unique within the scope of the parent ROUTE session. Properties common to the LCT sessions, and certain properties unique to individual LCT sessions, are given in a ROUTE signaling structure called a Service-based Transport Session Instance Description (S-TSID), which is part of the service layer signaling. Each LCT session is carried over a single Physical Layer Pipe (PLP). PLP is a portion of the Radio Frequency (RF) channel which has certain modulation and coding parameters. PLP is described further in ATSC A/322 Physical Layer Protocol specification available at "http://atsc.org/candidate-standard/a322-atsc-candidate-standard-physical-layer-protocol/". Different LCT sessions of a ROUTE session may or may not, be contained in different Physical Layer Pipes. The properties described in the S-TSID include the TSI value and PLP identifier (ID) for each LCT session, descriptors for the delivery objects and/or files, and Application Layer Forward Error Correction (FEC) parameters. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @sTSIDUri attribute of the userServiceDescription element.

The S-TSID may be represented as an XML document containing a S-TSID root element that conforms to the definitions in the XML schema that has namespace:
http://www.atsc.org/XMLSchemas/ATSC3/Delivery/ROUTESLS/1.0/

The abbreviation "routesls" should be used as the namespace prefix for any of the elements of this schema, if they appear in an XML document. For the initial release of this Standard the binding of this prefix to the namespace can be declared by including the following attribute, in the schema element of the XML document.
xmlns:routesls="http://www.atsc.org/XMLSchemas/ATSC3/Delivery/ROUTESLS/1.0/"

The normative XML schema for S-TSID is included in FIGS. 30A-C.

S-TSID fragment in FIG. 25 includes in LCT session a SRCFlow element and a RepairFlow element. These are described further.

The SrcFlow element describes a source flow. A source flow sends delivery objects to receiver. A delivery object is self-contained, typically associated with certain properties, metadata and timing-related information that are of relevance for the application. SRCFlow element along with its sub-elements an attributes is shown in FIG. 26. The SrcFlow may be represented as an XML document containing a SrcFlow root element that conforms to the definitions in the XML schema that has namespace:
http://www.atsc.org/XMLSchemas/ATSC3/Delivery/ROUTESLS/1.0/

The abbreviation "routesls" should be used as the namespace prefix for any of the elements of this schema, if they appear in an XML document. For the initial release of this Standard the binding of this prefix to the namespace can be declared by including the following attribute in the schema element of the XML document.
xmlns:routels="http://www.atsc.org/XMLSchemas/ATSC3/Delivery/ROUTESLS1.0"

SRCFlow element in FIG. 26 includes an Extended File Delivery Table (EFDT) element which is shown in FIG. 27.

The EFDT may be represented as an XML document containing a EFDT root element that conforms to the definitions in the XML schema that has namespace:
http://www.atsc.org/XMLSchemas/ATSC3/Delivery/ROUTESLS/1.0/

The abbreviation "routesls" should be used as the namespace prefix for any of the elements of this schema, if they appear in an XML document. For the initial release of this Standard the binding of this prefix to the namespace can be declared by including the following attribute in the schema element of the XML document.
xmlns:routesls="http://www.atsc.org/XMLSchemas/ATSC3/Delivery/ROUTES/1.0/"

The normative XML schema for EFDT is included in FIGS. 30A-C.

As mentioned previously S-TSID fragment FIG. 25 includes in LCT session a RepairFlow element. This is described further. FIG. 28 shows structure of RepairFlow element. RepairFlow element and its sub-elements and attributes provide information about Repair flow carried in the LCT session referenced by signaling metadata.

RapairFlow element consists of three attributes and two elements. These are described further. The element FECOTI specifies FEC object transmission information. ProtectedObject element is described below. @maximumDelay attribute specifies the maximum delay between any source packet in the source flow and the repair flow. This attribute is optionally signaled. When not signaled the value of this attribute is inferred to be equal to 0. Not signaling this attribute and instead inferring its value allows bit-savings. In another example some other default value may be used for the value of @maximumDelay attribute when it is not signaled. For example a value of 5000 may be used. Or some other value may be used. @overhead attribute indicates the overhead of repair flow in percentage value. @minBuffSize attribute specifies required buffer size for the repair flow.

The Repair Flow may be represented as an XML document containing a RepairFlow root element that conforms to the definitions in the XML schema that has namespace:
http://www.atsc.org/XMLSchemas/ATSC3/Delivery/ROUTESLS/1.0/

The abbreviation "routesls" should be used as the namespace prefix for any of the elements of this schema, if they appear in an XML document. For the initial release of this Standard the binding of this prefix to the namespace can be declared by including the following attribute in the schema element of the XML document.
xmlns:routesls=http://www.atsc.org/XMLSchemas/ATSC3/Delivery/ROUTESLS/1.0/

The normative XML schema for RepairFlow is included in FIGS. 30A-C.

The repair flow shown in it FIG. 28 includes a ProtectedObject element. Further details about ProtectedObject element are shown in FIG. 29. ProtectedObject element consists of four attributes. @sessionDescription attribute provides session description information for the source flow protected by this repair flow. @tsi attribute provide transport session identifier for the source flow protected by this repair flow. @sourceTOI provides the transport object identifier for the delivery object. @fecTransportObjectSize specifies default size of FEC transport object.

The normative XML schema for ProtectedObject is included in FIGS. 30A-C.

In XML schema various custom data types are defined. Also data types are defined for various elements. Information about some of the elements and data types for XML schema in FIGS. 30A-C is as follows:

ContentInfo in SrcFlow: A "string" data types is defined to be used for this element.

@version attribute of Extended file delivery table (EFDT): An unsignedInt data types id defined to be used for this attribute.

@maxExpiresDelta attribute of (EFDT): unsignedInt data types id defined to be used for this attribute.

FileTemplate, FDTParameters elements of EFDT: A "string" data types is defined to be used for this element.

In another example FDTParameters element maybe a data structure comprising one or more file descriptors as specified in the File Delivery over Unidirectional Transport (FLUTE) File Delivery Table (FDT). FLUTE FDT is defined in IETF: RFC 6726, "FLUTE—File Delivery over Unidirectional Transport," Internet Engineering Task Force, Reston, Va., November, 2012. http://tools.ietf.org/html/rfc6726 which is incorporated here in its entirety by reference.

In yet another example the FDTParameters element maybe a data structure comprising one or more file descriptors as specified in the 3GPP-defined FDT extensions as defined in MBMS 3GPP: TS 26.346 V12.4.0 (2014-12), "3rd Generation Partnership Project; Technical Specification Group Services and System Aspects; Multimedia Broadcast/Multicast Service (MBMS); Protocols and codecs (Release 12)", which is incorporated here in its entirety by reference. The FDTParameters element may include one or more of elements:

Cache-Control, Alternate-Content-Location-1, Alternate-Content-Location-2, Base-URL-1 and Base-URL-2, and attribute @Availability-Time. The semantics of these elements and attribute are defined in those documents and described below, In an example, Alternate-Content-Location-1 and/or Alternate-Content-Location-2 elements provide URIs for file repair. The number of byte-range based file repair service URIs may be determined by the number of "Alternate-Content-Location-1" and "Alternate-Content-Location-2" elements in the FDT. Alternate-Content-Location-1 and/or Alternate-Content-Location-2 elements provide the references to the file repair server's resource via the "xs: anyURI" value.

In an example, Base-URL-1 and/or Base-URL-2 elements provide base URL for file repair. When present, the "Base-URL-1" and/or "Base-URL-2" elements may provide base URLs that may be used to resolve a relative reference included in any Alternate-Content-Location-1 and/or Alternate-Content-Location-2 element, respectively.

In an example, Cache-Control element provides information about caching directives for file. In case the element "Cache-Control" is not present in the FDT for a corresponding file, the terminal should assume that no caching directives can be given for that file and may handle the caching of that file on a best effort basis.

@maximumDelay attribute of repair flow: An unsignedInt data types id defined to be used for this attribute.

@overhead attribute of repair flow: unsignedInt based type defined for this attribute.

@minBuffSize attribute of repair flow: An unsignedInt data types id defined to be used for this attribute.

FECOTI of repair flow: A "string" data types is defined to be used for this element.

@sessionDescripion attribute of ProtectedObject: A "string" data types is defined to be used for this attribute.

@tsi attribute of ProtectedObject: An unsignedInt data types is defined to be used for this attribute.

@sessionDescription attribute of ProtectedObject: A "string" data types is defined to be used for this attribute.

@fecTransportObjectSize at note of ProtectedObject: An unsignedInt data types is defined to be used for this attribute.

Custom XML data types are defined and used for certain elements and/or attributes. These allow only valid values to be defined and used for various elements and/or attributes. Following custom data types are defined:

Data type for Port is defined based on XML unsignedShort with value of 0 excluded. This allows only valid UDP port values to be defined.

Pattern based data type for IP address is defined to allow only valid IPv4 addresses. This allows only valid IP address values to be defined as opposed to any general purpose string.

Data type for Physical Layer Pipe identifier is defined to be a valid PLP value.

A typical delivery and streaming system needs to convey time information from transmission side to the receiver side. For example This allows the receiver which does not have any other clock source to know current date and time. It also allows synchronization of various streaming media components by referring to common system time which is signaled by transmission side.

For ATSC system time may be delivered via physical layer and/or via transport layer and/or via IP layer. For example system time may be delivered in the ATSC physical layer as a 32-bit, count of the number of seconds since Jan. 1, 1970 00:00:00 International Atomic Time (TAI), which is the Precision Time Protocol (PTP) epoch as defined in IEEE 1588. PTP is defined in "IEEE: IEEE 1588-2008 PTP, "Standard for a Precision Clock Synchronization Protocol for Networked Measurement and Control Systems,", Institute for Electrical and Electronics Engineers."

Additional system time related information may be signaled in SystemTime element delivered at transport layer. In one example the SystemTime, element may have a structure, as shown in FIG. 31. FIG. 31 shows SystemTime XML element and its attributes with their semantic meaning.

System Time may be represented as an XML document containing a SystemTime root, element that conforms to the definitions in the XML schema that has namespace; http://www.atsc.org/XMLSchemas/ATS(C3/Delivery/SYSTIME/1.0/

The abbreviation "systime" should be used as the namespace prefix for any of the elements of this schema, if they appear in an XML document. For the initial release of this Standard the binding of this prefix to the namespace can be declared by including the following attribute in the schema element, of the XML document.

xmlns:systime="http://www.atsc.org/XMLSchemas/ATSC3/Delivery/SYSTIME/1.0/"

The normative XML schema for SystemTime is shown in FIG. 32.

In XML schema in FIG. 32 A Custom XML data type—"Day type" is defined which can have a valid value between 1 to 31, inclusive only to indicate a valid day of the month.

A Custom XML data type—"Hour type" is defined which can have a valid value between 0 to 24, inclusive only to indicate a valid day of the month.

Additional variants are now described for a User Service Bundle Description Fragment for MMT.

FIGS. 33A-B show an example User Service Bundle Description Fragment for MMT.

FIGS. 34A-B show another example User Service Bundle Description Fragment for MMT.

The USBD fragment for MMT for ATSC 3.0 includes following:

Child attribute serviceId under the element userServiceDescription

Child element contentAdvisoryRating under the element userServiceDescription;

Child element Channel and its child attributes serviceGenre, serviceIcon, and child element Service Description and its child attributes service DescrTex, serviceDescrLang under the element userServiceDescription;

Child element mpuComponent and its child attributes mmtPackageID and nextMMTPackageID nextMmtPackageId under the element userServiceDescription:

Child element routeComponent and its child attributes sTSIDUri, sTSIDDestinationIpAddress, sTSIDDestinationUdpPort, sTSIDSourceIPAddress, sTSIDMajorProtocolVersion, sTSIDMinorProtocolVersion under the element userServiceDescription:

Child element broadbandComponent and its child attributes fullMPDUri under the element userServiceDescription: and Child element ComponentInfo and its child attributes componentType, componentRole, componentProtectedFlag, componentId, componentName under the element userServiceDescription.

Preferably the same information should not be repeated by emission side in the MMT USBD when it is carried in the service announcement. In this case information in service announcement should take precedence.

The bundleDescription may be represented as an XML document containing a bundleDescription root element that conforms to the definitions in the XML, schema that has namespace:

http://www.atsc.org/XMLSchemas/ATSC3/Delivery/MMTUSD/1.0/

Semantics of various syntax elements in FIGS. 33A-B and FIGS. 34A-B are as shown below.

bundle Description—Is root element of the User Service Bundle Description.

userServiceDescription—Element corresponds to single instance of an ATSC 3.0 Service.

@globalServiceID—A globally unique URI that identifies the ATSC 3.0 Service. This parameter is used to link USBD to Electronic Service Guide data. Electronic Service Guide provides description about services and programs along with their schedule and other metadata information.

@serviceId—This attribute provides a reference to corresponding service entry in a service list table. The value of this attribute is the same value of service identifier assigned to the service entry Name—Name of the ATSC3.0 service in the language specified by @lang attribute.

@lang—Language of the ATSC 3.0 service name. The language may be specified according to Best Current Practice (BPC) 47. BCP 47 describes tags for identifying languages and is available at https://tools.ietf.org/html/bcp47. It is incorporated herein by reference in its entirety.

serviceLanguage—Available languages of the ATSC 3.0 service. The language may be specified according to BCP 47.

contentAdvisoryRating—Specifies the content advisory rating, as defined in the ATSC 3.0 service announcement.

Channel—This element contains information about the service.

@serviceGenre—This attribute indicates primary genre of the service. This attribute may be instantiated to describe the genre category for the service. The <classificationSchemeURI> is http://www.atsc.org/XMLSchemas/mh/2009/1.0/genre•cs/ and the value of serviceGenre may match a termID value from the classification schema in Annex B of A/153 Part 4. A/153 Part 4 describes ATSC mobile DTV standard- Announcement and is available at http://atsc.org/wp-content/uploads/2015/03/a_153-Part-4-2009.pdf. It is incorporated herein by reference in its entirety.

@serviceIcon—This attribute indicates the URL for the icon used to represent this service.

Service DescriptionText—Contains service description possibly in multiple languages.

@serviceDescrText—This attribute indicates description of the service.

@serviceDescrLang—This attribute indicates the language of the serviceDescrText. Semantics of xs:lang may be followed.

mpuCamponent—A description about the contents components of ATSC 3.0 service delivered as MPUs.

@mmtPackageId—Reference to a MMT Package for content components of the ATSC 3.0 Service delivered as MPUs.

@nextMmtPackageId—Reference to a MMT Package to be used after the one referenced by @mmtPackageId in time for content components of the ATSC 3.0 Service delivered as MPUs.

routeComponent—Provides a description about the contents components of ATSC 3.0 Service delivered by ROUTE.

@sTSIDUri—Reference to the S-TSID fragment which provides service access related parameters to the Transport sessions carrying contents of this ATSC 3.0 Service.

@TSIDDestinationIpAddress—A string containing the dotted-IPv4 destination address of the packets carrying S-TSID for this service. When not present the value of this attribute is inferred to be current MMTP session's destination IP address.

@sTSIDDestinationUdpPort—A string containing the UDP port number of the packets carrying S-TSID for this service.

@sTSIDSourceIpAddress—A string containing the dotted-IPv4 source address of the packets carrying S-TSID) for this service.

@sTSIDMajorProtocolVersion—Major version number of the protocol used to deliver the S-TSID for this service. When not present the value of this attribute is inferred to be 1.

@TSIDMinorProtocolVersion—Minor version number of the protocol used to deliver the S-TSID for this service. When not present the value of this attribute is inferred to be 0.

broadbandComponent—This element provides a description about the contents components of ATSC 3.0 Service delivered by broadband.

@fullMPDUri—Provides a reference to an Dynamic Adaptive Streaming over HITP (DASH) Media Presentation Description (MPD) fragment which contains descriptions for content components of the ATSC 3.0 Service delivered over broadband. DASH is specified in ISO/IEC Final Draft International Standard (FDIS) 23009-1:2014 (which is incorporated by reference herein in its entirety).

DASH MPD is a formalized description for a Media Presentation for the purpose of providing a streaming service.

DASH Media Presentation is a collection of data that Heat establishes a bounded or unbounded presentation of media content.

ComponentInfo—Contains information about components available in the service. For each component this includes information about component type, component role, component name, component identifier, component protection flag.

@componentType—This attribute indicates the type of this component. Value of 0 indicates an audio component. Value of 1 indicates a video component. Value of 2 indicates a closed caption component. Values 3 to 7 are reserved.

@componentRole—This attribute indicates the role or kind of this component. For audio (when componentType attribute above is equal to 0): values of componentRole attribute are as follows: 0=Complete main, 1=Music and Effects, 2=Dialog, 3=Commentary; 4=Visually Impaired, 5=Hearing Impaired, (6=Voice Over, 7-254=reserved, 255-=unknown. For Video (when componentType attribute above is equal to 1) values of component role attribute are as follows: 0=Primary video, 1·254=reserved, 255=unknown.

For Closed Caption component (when componentType attribute above is equal to 2) values of componentRole attribute are as follows: 0=Normal, 1=Easy reader, 2·254=reserved, 255=unknown.

When @componentType attribute above has a value is between 3 to 7, inclusive, the @componentRole value may be equal to 255.

@componentProtectedFlag—This attribute indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0.

@componentId—This attribute indicates the identifier of this component. The value of his attribute may be the same as the asset_id in the MP table corresponding to this component.

@componentName—This attribute indicates the human readable name of this component.

In addition to the above elements and attributes an @apdUri attribute is defined in FIG. 33. In this case the @apdUri is defined as an attribute of its routeComponent element. Since @apdUri is included as an attribute it can only indicate one URI. In this case this apd URI signalled as value of @apdUri attribute Semantics of @apdUri may be as defined below:

@apdUri—This optional attribute may provide a reference to the Associated Procedure Description (APD) fragment which provides file repair related information for the content components of ATSC 3.0 service delivered by ROUTE. @apd Uri points to an APD fragment which is described below.

When @apdURI is present, a least one Alternate-Content-Location-1 element may be present in the EFDT element of the S-TSID fragment pointed by the routeComponent element's @sTSIDUri attribute.

An example EFDT is shown in FIG. 27. The location(s) of the one or more file repair servers, in the form of HTTP(s) URLs, which the receiver may contact to request file repair data are provided by the Alternate-Content-Location-1 and Alternate-Content-Location-2 child elements of the EFDT element.

An apd element with @adpUri attribute is defined in FIGS. 34A-B. In this case the apd element is defined as a child element of its routeComponent element. The cardinality of apd is 0 . . . N which allows including multiple apd elements as child elements of routeComponent element. Semantics of apd element and @apdUri attribute are as defined below:

apd—Container element for APD fragment URI.

@apdUri—This optional attribute may provide a reference to the APD fragment which provides file repair related information for the content components of ATSC 3.0 Service delivered by ROUTE. @apdUri points to an APD fragment which is described below.

When @apd URI is present at least one Alternate-Content-Location-1 element may be present in the EFDT element of the S-TSID fragment pointed by the routeComponent @sTSIDUri.

The associated procedure description fragment is described as follows:

The APD is an service layer signaling metadata fragment containing information for use in conjunction with certain parameters in the EFDT element of the S-TSID fragment to govern the optional use by the receiver of the HTTP file repair functionality. The file repair procedure corresponds to an HTTP request/response transaction whereby a receiver, unable to acquire the entire object delivered by ROUTE, can request and obtain the missing data via broadband from a file repair server.

An example APD fragment is shown in FIG. 35. The APD fragment provides temporal information, under the postFileRepair element, for the receiver, if it wishes to perform the file repair procedure to obtain missing data. The offsetTime child element of postFileReception represents the time interval in seconds that the receiver may wait, after the end of transmission for the file of interest has occurred, before it can start the file repair procedure. The means by which the receiver could determine the end of file transmission, and the associated time window within which it is allowed to perform file repair. The randomTimePeriod child element of postFileRepair defines a time window within which the receiver may calculate a random value. This value represents an additional wait time, after the initial, fixed delay conveyed by offsetTime has transpired, by the receiver before it submits the file repair request. The purpose of the random wait is to better ensure statistically uniform distribution of tile repair request traffic arriving at the file repair server, from multiple receivers.

The APD may be represented as an XML document containing an associatedProcedureDescription root element that conforms to the definitions in the XML schema that has the namespace:

http://www.atsc.org/XMLSchemas/ATSC3/Delivery/ROUTEAPD/1.0/

The following text specifies the semantics of the elements and attributes in the APD fragment.

associatedProcedureDescription—Root element of the Associated Procedure Description.

postFileRepair—Container of temporal information that govern the start time of the file repair procedure.

@offsetTime—A time interval in seconds that the receiver may wait, after broadcast file transmission has ended, before it can begin the file repair procedure. If this attribute is absent or set to '0', the receiver should not employ a wait time before computing a random time within the time window given by @randomTimePeriod to initiate the file repair request. When not present offsetTime is inferred to be equal to 0.

@randomTimePeriod—After the fixed delay conveyed by offsetTime has transpired, this attribute, as part of the file repair procedure, defines a time window in seconds within which the receiver may calculate a random value. The value of @randomTimePeriod represents an additional wait time by the receiver before it is permitted to initiate the file repair request.

Although FIGS. 13A-B through FIG. 35 show particular examples of syntax, semantics and schema, additional variants are possible. These include the following variations:

Different data types may be used for an element compared to those shown above. For example instead of unsignedByte data type unsignedShort data type may be used. In another example instead of unsigned Byte data type a String data, type may be used.

Instead of signalling a syntax as an attribute it may be signaled as an element. Instead of signalling a syntax as an element it may be signaled as an attribute.

The bit width of various fields may be changed for example instead of 4 bits for an element in the bitstream syntax 5 bits or 8 bits or 2 bits may be used. The actual values listed here are just examples.

Instead of XML format and XML schema Javascript Object Notation (JSON) format and JSON schema may be used. Alternatively the proposed syntax elements may be signaled using a Comma Separated Values (CSV), Backus-Naur Form (BNF), Augmented Backus-Naur Form (ABNF), or Extended Backus•Naur Form (EBNF).

Cardinality of an element and/or attribute may be changed. For example For example cardinality may be changed from "1" or cardinality may be changed from "1" to "0N" or cardinality may be changed from "1" to "1 . . . N" or cardinality may be changed from "0 . . . " to "0 . . . N" or cardinality may be changed from "0 . . . " to "1 . . . N".

An element and/or attribute may be made required when it is shown above as optional. An element and/or attribute may be made optional when it is shown above as required.

Some child elements may instead he signaled as parent elements or they may be signaled as child elements of another child elements.

All the above variants are intended to be within the scope of the present invention.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable, media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc; optical disc, digital versatile disc (DVD), floppy disk and Blu-ray disc where disks usually reproduce data magnetically, while discs reproduce data optically with lasers. Combinations of the above should also be included within the scope of computer readable medium.

Instructions may be executed by one or more processors, such as one or more digital signal. processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units, Rather, as described above, various units may be combined in a hardware unit or provided by a collection of intraoperative hardware units, including one or more processors as described above, in conjunction with suitable software and/or firmware.

Moreover, each functional block or various features of the base station device and the terminal device (the video decoder and the video encoder) used in each of the aforementioned embodiments may be implemented or executed by a circuitry which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology the integrated circuit by this technology is also able to be used.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for signaling a service-based transport instance description fragment, the method comprising:
    signaling the service-based transport instance description fragment represented as an XML, document;
    the service-based transport instance description fragment includes:
    a repair flow element, having use property being 0 and 1, including subordinate elements and attributes containing information about the repair flow within its parent Layered Coding Transport (LCT) channel, wherein the a repair flow element includes:
        a maximum delay attribute, having use property being 0 and 1, specifying a maximum delivery delay between any source packet in a source flow and the repair flow, wherein the maximum delay attribute has a data type of unsigned integer, and
        a minimum buffer size attribute, having use property being 0 and 1, specifying a required buffer size to handle all associated objects that are assigned to a super-object, wherein the minimum buffer size attribute has a data type of unsigned integer.

2. The method of claim 1, wherein the repair flow element further includes an overhead attribute, having use properly being 0 and 1, specifying an overhead in percentage, wherein the overhead attribute has a data type of unsigned short.

3. A method for receiving a user service bundle description fragment, the method comprising:
    receiving the service-based transport instance description fragment represented as an XML, document;
    wherein:
    the service-based transport instance description fragment includes:
    a repair flow element, having use property being 0 and 1, including subordinate elements and attributes containing information about the repair flow within its parent Layered Coding Transport (LCT) channel, wherein the a repair flow element includes:
        a maximum delay attribute, having use property being 0 and 1, specifying a maximum delivery delay between any source packet in a source flow and the repair flow wherein the maximum delay attribute has a data type of unsigned integer, and
        a minimum buffer size attribute, having use property being 0 and 1, specifying a required buffer size to handle all associated objects that are assigned to a super-object, wherein the minimum buffer size attribute has a data type of unsigned integer.

4. A signaling device for signaling a user service bundle description fragment, the signaling device comprising:
    a processor, and
    a memory associated with the processor; wherein the processor is configured to perform the following steps:
    signal the service-based transport instance description fragment represented as an XML, document;
    wherein:
    the service-based transport instance description fragment includes:
    a repair flow element, having use property being 0 and 1, including subordinate elements and attributes containing information about the repair flow within its parent Layered Coding Transport (LCT) channel, wherein the a repair flow element includes:
        a maximum delay attribute, having use property being 0 and 1, specifying a maximum delivery delay between any source packet in a source flow and the repair flow, wherein the maximum delay attribute has a data type of unsigned integer, and
        a minimum buffer size attribute, having use property being 0 and 1, specifying a required buffer size to handle all associated objects that are assigned to a super-object, wherein the minimum buffer size attribute has a data type of unsigned integer.

5. A receiving device for receiving a user service bundle description fragment, the signaling device comprising:
    a processor, and
    a memory associated with the processor; wherein the processor is configured to perform the following steps:
    receiving the service-based transport instance description fragment represented as an XML, document;
    wherein:
    the service-based transport instance description fragment includes:
    a repair flow element, having use property being 0 and 1, including subordinate elements and attributes containing information about the repair flow within its parent Layered Coding Transport (LCT) channel, wherein the a repair flow element includes:
        a maximum delay attribute, having use property being 0 and 1, specifying a maximum delivery delay between any source packet in a source flow and the repair flow, wherein the maximum delay attribute has a data type of unsigned integer, and
        a minimum buffer size attribute, having use property being 0 and 1, specifying a required buffer size to handle all associated objects that are assigned to a super-object, wherein the minimum buffer size attribute has a data type of unsigned integer.

* * * * *